United States Patent
Shashikant Rao et al.

(10) Patent No.: US 11,663,493 B2
(45) Date of Patent: May 30, 2023

(54) METHOD AND SYSTEM OF DYNAMIC MODEL SELECTION FOR TIME SERIES FORECASTING

(71) Applicant: Intuit Inc., Mountain View, CA (US)

(72) Inventors: Shashank Shashikant Rao, San Jose, CA (US); Sambarta Dasgupta, Sunnyvale, CA (US); Colin Dillard, Redwood City, CA (US)

(73) Assignee: Intuit Inc., Mountain View, CA (US)

(*) Notice: Subject to any disclaimer, the term of this patent is extended or adjusted under 35 U.S.C. 154(b) by 1102 days.

(21) Appl. No.: 16/262,208

(22) Filed: Jan. 30, 2019

(65) Prior Publication Data

US 2020/0242483 A1 Jul. 30, 2020

(51) Int. Cl.
*G06F 16/20* (2019.01)
*G06N 3/126* (2023.01)
*G06N 5/04* (2023.01)
*G06F 16/28* (2019.01)

(52) U.S. Cl.
CPC .......... *G06N 3/126* (2013.01); *G06F 16/285* (2019.01); *G06N 5/04* (2013.01)

(58) Field of Classification Search
CPC ......... G06F 16/285; G06N 3/126; G06N 5/04
See application file for complete search history.

(56) References Cited

U.S. PATENT DOCUMENTS

| | | | |
|---|---|---|---|
| 4,914,603 A | 4/1990 | Wood | |
| 7,660,705 B1 | 2/2010 | Meek et al. | |
| 10,364,662 B1 * | 7/2019 | Basu | G06Q 10/06313 |
| 11,281,969 B1 | 3/2022 | Rangapuram et al. | |
| 2005/0222929 A1 | 10/2005 | Steier et al. | |
| 2008/0183648 A1 | 7/2008 | Goldberg et al. | |
| 2010/0332210 A1 | 12/2010 | Birdwell et al. | |
| 2014/0019448 A1 | 1/2014 | Leonard et al. | |
| 2014/0114897 A1 | 4/2014 | Nakamura et al. | |
| 2015/0253463 A1 | 9/2015 | Narayanaswamy | |
| 2015/0254569 A1 | 9/2015 | Baughman et al. | |

(Continued)

FOREIGN PATENT DOCUMENTS

WO WO-2018085859 A1 * 5/2018 ........... G06F 16/254

OTHER PUBLICATIONS

Barnhart et al., "Branch-and-Price: Column Generation for Solving Huge Integer Programs," Operations Research, vol. 46, No. 3, pp. 316-329 (Year: 1998).

(Continued)

*Primary Examiner* — Tarek Chbouki
(74) *Attorney, Agent, or Firm* — Paradice & Li LLP

(57) ABSTRACT

Forecasts are provided based on dynamic model selection for different sets of time series. A model comprises a transformation and a prediction algorithm. Given a time series, a transformation is selected for the time series and a prediction algorithm is selected to make a forecast based on the transformed time series. Sets of time series are distinguished from each other based on diverse sparsities, temporal scales and other time series attributes. A model is dynamically selected based on time series attributes to increase forecasting accuracy and decrease forecasting computation time. The dynamic model selection is based on the creation of a meta-model from historical sets of historical time series.

26 Claims, 13 Drawing Sheets

(56) References Cited

U.S. PATENT DOCUMENTS

| | | | |
|---|---|---|---|
| 2018/0046926 A1* | 2/2018 | Achin | G06N 20/20 |
| 2018/0060738 A1* | 3/2018 | Achin | G06N 20/00 |
| 2018/0060744 A1* | 3/2018 | Achin | G06N 5/04 |
| 2018/0137522 A1* | 5/2018 | Modarresi | G06Q 30/0201 |
| 2018/0150609 A1* | 5/2018 | Kim | G06N 3/04 |
| 2018/0219889 A1 | 8/2018 | Oliner et al. | |
| 2018/0276562 A1* | 9/2018 | Woulfe | G06N 3/0445 |
| 2018/0293462 A1* | 10/2018 | Ambati | G06N 5/022 |
| 2018/0300737 A1 | 10/2018 | Bledsoe et al. | |
| 2019/0012684 A1* | 1/2019 | Cui | H04N 21/44226 |
| 2019/0122138 A1* | 4/2019 | Li | G06N 20/00 |
| 2019/0122307 A1 | 4/2019 | Sayed | |
| 2019/0130256 A1 | 5/2019 | Ghahramani | |
| 2019/0228336 A1* | 7/2019 | Kanagawa | G06N 3/0481 |
| 2019/0258927 A1* | 8/2019 | Chen | G06N 3/08 |
| 2020/0012886 A1* | 1/2020 | Walters | G06F 16/254 |
| 2020/0090003 A1* | 3/2020 | Marques | G06F 17/18 |
| 2020/0111109 A1* | 4/2020 | Lei | G06N 20/10 |
| 2020/0175354 A1* | 6/2020 | Volodarskiy | G06N 3/08 |
| 2020/0285503 A1 | 9/2020 | Dou et al. | |
| 2020/0372431 A1 | 11/2020 | Okimoto et al. | |
| 2021/0150257 A1 | 5/2021 | Dasgupta et al. | |
| 2021/0150384 A1 | 5/2021 | Dasgupta et al. | |
| 2022/0027082 A1 | 1/2022 | Okuyama et al. | |

OTHER PUBLICATIONS

"Bean," "Genetic Algorithms and Random Keys for Sequencing and Optimization," ORSA Journal on Computing, vol. 6, No. 2, pp. 154-160 (Year: 1994).

Hyndman et al., "Optimal Combination Forecasts for Hierarchical Time Series," Computational Statistics & Data Analysis, vol. 55, No. 9, pp. 2579-2589 (Year: 2011).

Laptev et al., "Time-Series Extreme Event Forecasting with Neural Networks at Uber," International Conference on Machine Learning, No. 34, 5 pages (Year: 2017).

Zhu et al., "Deep and Confident Prediction for Time Series at Uber," Data Mining Workshops (ICDMW), 2017 IEEE International Conference on Data Mining Workshops, IEEE, 8 pages (Year: 2017).

Talagala et al., "Meta-Learning How to Forecast Time Series", Monash University, Department of Econometrics and Business Statistics, 30-pages, Apr. 30, 2018.

Kuck et al., "Meta-Learning with Neural Networks and Landmarking for Forecasting Model Selection an Empirical Evaluation of Different Feature Sets Applied to Industry Data," 2016 International Joint Conference On Neural Networks (IJCNN), IEEE, Jul. 24, 2016 (Jul. 24, 2016), pp. 1499-1506, XP032992342, DOI: 10.1109/IJCNN.2016.7727376.

Prudencio et al., "Meta-Learning Approaches to Selecting Time Series Models," Neurocomputing, Elsevier, Amsterdam, NL, vol. 61, Oct. 1, 2004 (Oct. 1, 2004), ISSN: 0925-2312, DOI: 10.1016/J.Neucom.2004.03.008.

Wang et al., "Rule Induction for Forecasting Method Selection: Meta-Learning the Characteristics of Univariate Time Series," Neurocomputing, Elsevier, Amsterdam, NL, vol. 72, No. 10-12, Jun. 1, 2009 (Jun. 1, 2009), pp. 2581-2594, XP026093465, ISSN: 0925-2312, DOI: 10.1016/J.Neucom.2008.10.017.

Williams, "Imposing and Testing Equality Constraints in Models," University of Notre Dame, pp. 1-9, 2015.

Wolak, "An Exact Test for Multiple Inequality and Equality Constraints in the Linear Regression Model," Journal of the American Statistical Association, vol. 82, No. 399, Theory and Methods, pp. 782-793, Sep. 1987.

\* cited by examiner

700

800

1000

1200

| TIME SERIES IDENTIFIER 1211 | FEATURE A 1212 | FEATURE B 1213 | FEATURE N 1214 | LABEL 1215 |
|---|---|---|---|---|
| 1221 | 1222 | 1223 | 1224 | 1225 |
| 1231 | 1232 | 1233 | 1234 | 1235 |
| 1241 | 1242 | 1243 | 1244 | 1245 |

METHOD AND SYSTEM OF DYNAMIC MODEL SELECTION FOR TIME SERIES FORECASTING

BACKGROUND

Time series data is sequenced data collected over a period of time. Traditional time series forecasting utilizes machine learning to predict data in the future, such as by choosing a single predictive algorithm to make predictions based on a collection of time series. With a traditional data management system, a single predictive algorithm is trained for time series data of the collective time series. Such a traditional data management system has the time consuming task of attempting to choose a single predictive algorithm for the entire training set of time series data. With a traditional data management system, a training search is implemented from which a single predictive algorithm is selected, which traditionally requires a training search that exhaustively seeks a prediction algorithm to be applied for the collective time series.

Such a single predictive algorithm is utilized by a traditional data management system to make future predictions for each time series. Selecting a single predictive algorithm for each time series of the entire data set traditionally yields predictions having relatively decreased accuracy for diverse sets of time series, such as millions of sets of diverse time series having different attributes. As a specific illustrative example of reduced accuracy of a traditional data management system, a single predictive algorithm that performs well with dense time series data typically does not perform well with sparse time series data.

Consequently, there is a significant need for a technical solution to the long-standing technical problem of forecasting diverse time series of data management systems.

SUMMARY

As discussed in more detail below, embodiments of the present disclosure represent a technical solution to the technical problem of forecasting diverse time series of data management systems by utilizing a meta-modeling approach to dynamically select the right prediction algorithm to be applied to make future-looking predictions for each disparate time series. In one embodiment, a meta-model is a model of a model. In one embodiment, the technical solution to the technical problem of forecasting diverse time series of data management systems includes providing forecasts based on dynamic model selection for diverse sets of time series. In one embodiment, a selected model comprises a transformation and a prediction algorithm. In one embodiment, different prediction algorithms and different transforms are selected for different groups of time series data that differ based on at least one property, such as sparsity as discussed further below with respect to FIGS. 7 and 8. In one embodiment, each time series is a respective training set. As a specific illustrative example, there could be millions of training sets, and it is considered infeasible for a human mind to examine each of these training sets to determine an appropriate model. Due to such infeasibility, traditional data management systems choose a single model for all of the time series data. In contrast to such traditional data management systems, embodiments of the present disclosure select an appropriate model across all models for each time series.

In one embodiment, given a specific time series, a transformation is selected for the time series and a prediction algorithm is selected to make a forecast based on the transformed time series. In one embodiment, sets of time series are distinguished from each other based on diverse sparsities, temporal scales, and/or any other suitable time series attributes. In one embodiment, a model is dynamically selected based on time series attributes to increase forecasting accuracy and decrease forecasting computation time. In one embodiment, the dynamic model selection is based on the creation of a meta-model from historical sets of time series. In one embodiment, faster and more accurate predictions are made for a time series based on the various properties of the time series, including sparsity.

BRIEF DESCRIPTION OF THE DRAWINGS

FIG. 12 is a specific illustrative example table of model labels for time series forecasting, in accordance with one embodiment.

Figure 1:
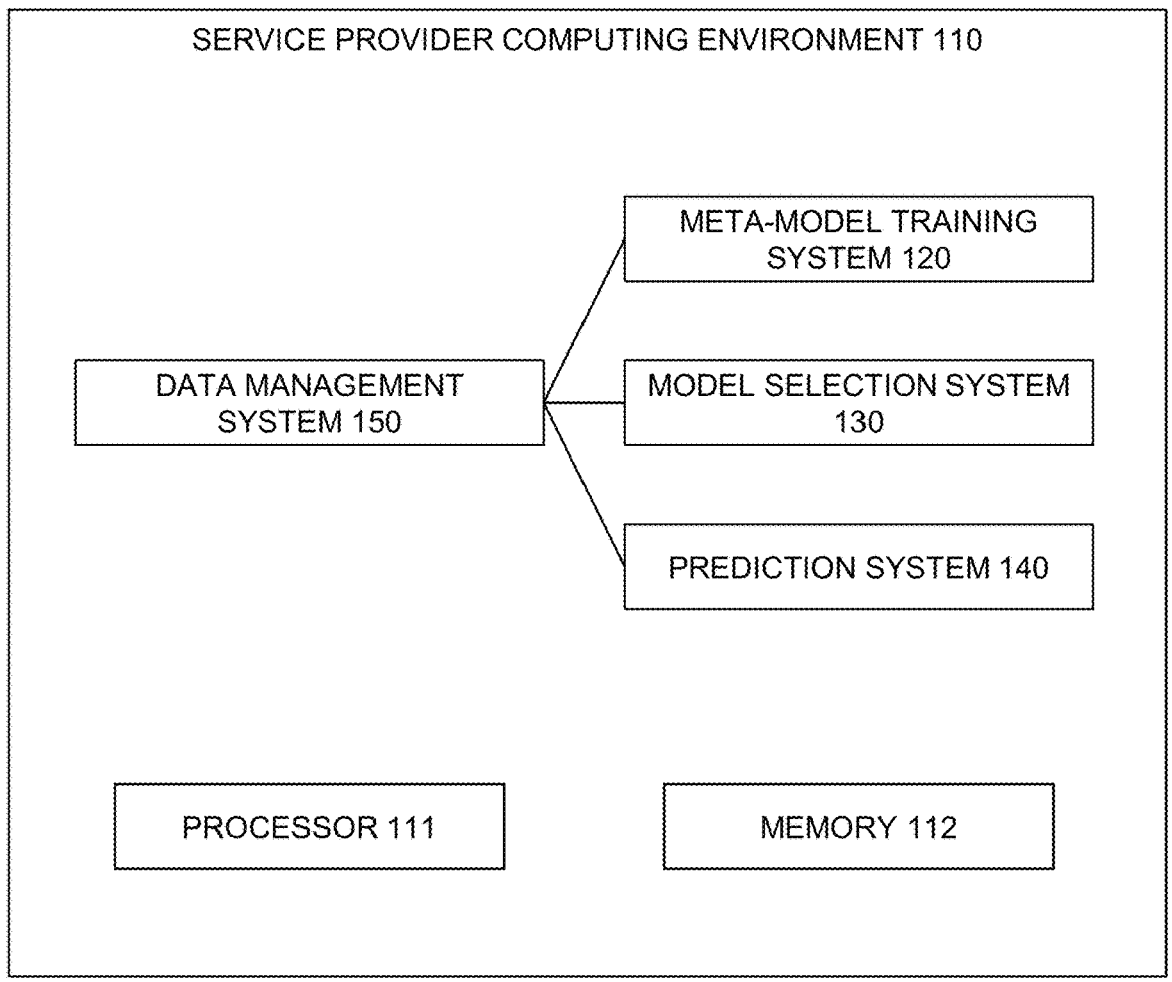
FIG. 1 is a functional block diagram of a production environment for time series forecasting, in accordance with one embodiment.

Common reference numerals are used throughout the figures and the detailed description to indicate like elements. One skilled in the art will readily recognize that the above figures are examples and that other architectures, modes of operation, orders of operation, elements, and functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Overview

Forecasting is integral to society. Historically, attempts have been made to forecast weather patterns, economic events, sport outcomes, and other societal events. Such historical forecasting has been accomplished through methods such as human intuition, expert opinions, and analysis of past results utilizing traditional statistics. Forecasting has also recently been achieved through machine learning techniques, in which new outcomes are predicted from previously known results.

One type of forecasting is time series forecasting, which is often based on a data set that represents collected information over a period of time. Time series forecasting is useful for many purposes such as economic forecasting, sales forecasting, expense predicting, stock market projecting, yield projecting, process and quality control estimating, inventory forecasting, workload projecting, utility forecasting, census projecting, and various other forecasting purposes. Traditional time series modeling options include linear versus non-linear options, parametric versus non-parametric options, univariate versus non-univariate options, and various other modeling options. Traditional time series modeling produces forecasts based on an understanding of drivers of change such as long-term trends, seasonal effects, abnormal fluctuations, and various other drivers.

FIG. 1 is a functional block diagram of a production environment 100 for time series forecasting, in accordance with one embodiment. It is to be understood that the diagram of FIG. 1 is for exemplary purposes and is not meant to be limiting. In the specific illustrative example of FIG. 1, the production environment 100 includes a service provider computing environment 110 comprising a meta-model training system 120, a model selection system 130, a prediction system 140, and a data management system 150.

In the specific illustrative example of FIG. 1, the production environment 100 includes a processor 111 and a memory 112. In one embodiment, the memory 112 includes instructions stored therein and which, when executed by the processor 111, performs a process. In one embodiment, the production environment 100 includes instructions representing processes of the meta-model training system 120, the model selection system 130, the prediction system 140, and the data management system 150.

In one embodiment, the data management system 150 comprises time series data, such as time varying data having varying levels of sparsity. Time series data includes, but is not limited to, digital signal processing, audio processing, video processing, weather information, volume of users per day, financial transactions of users, commodity pricing, daily sales, event streams, and/or any other suitable data with parameters that change with time.

As a specific illustrative example, embodiments forecast resource utilization in cloud computing environments. In this example, asset performance and utilization are improved for processors 111, memory 112, networks, disks, and/or any other suitable cloud infrastructure components. Cloud computing environments produce time series based on customer demand, seasonality, business cycles, and/or any other suitable cloud provisioning factors. Forecasting cloud resource utilization is considered to have the benefit of reducing energy consumption through the implementation of a resource allocation strategy.

As another specific illustrative example, time series data may comprise cash flow, which includes amounts of money transferred into and out of a business. Cash flow is typically measured during a specified period of time, and, in some embodiments, such measurements are treated as sets of time series. Cash flow analysis is typically considered to be important for a business to maintain adequate liquidity. Maintaining liquidity is considered beneficial because, even if a business is profitable, if it experiences a shortage of cash, it cannot meet its operational obligations and cannot continue to provide products and services to its customers. Furthermore, cash flow analysis is considered beneficial for individuals who desire to manage their personal finances. It is to be understood that embodiments are not limited to time series of cash flow, and that embodiments may apply to any other suitable time series.

Under the specific illustrative example of cash flow forecasting, a number of different time series are derived from the financial transactions of a given small business. Financial transactions include sales data, invoice data, income expense data, transfer data, and/or any other suitable financial transactions. In one embodiment, each time series data set comprises varying levels of sparsity. As a specific illustrative example, a time series data set of sales may be relatively dense due to a high volume of sales transactions, such as sales at a grocery store. As a specific illustrative example, a time series data set of payroll transactions may be moderately sparse due to a moderate volume of paychecks that are provided to employees every two weeks. As a specific illustrative example, a time series data set of government regulation transactions may be severely sparse due to a low volume of payments to regulatory entities that occur once a quarter. It is to be understood that the infrequency of transactions of a time series can impact the sparsity of the time series.

In one embodiment, the meta-model training system 120 models financial transactions as historical time series data sets. In one embodiment, the service provider computing environment 110 utilizes the historical time series data sets and forecasts those data sets into the future. Such forecasts are beneficial to users of the service provider computing environment 110 to provide insights into events that may occur in the future. It is to be understood that the service provider computing environment 110 can apply to any time series and is not limited to the specific illustrative example of cash flow forecasting. In one embodiment, improving the accuracy of predictions provides an improved relationship between the range of possibilities of what an actual outcome will be.

In one embodiment, the service provider computing environment 110 includes real-time forecasting of millions of time series having differing characteristics. In one embodiment, characteristics of time series differ based on the volume of historical information. As a specific illustrative example, a first user of a data management system may have a long history of usage of the service provider services while a second user of the data management system may be a new user with little historical usage. In this specific illustrative example, the time series associated with the first user differ from the time series associated with the second user based on the volume of data associated with the sets of time series. As a further specific illustrative example, transactions of businesses may represent different periodic behavior in which certain transactions are associated with certain periods of time.

In one embodiment, different types of prediction algorithms are applied to these different types of time series. In one embodiment, the service provider computing environment 110 selects the right type of prediction algorithm for the right kind of time series. As a specific illustrative example, if there are one hundred time series in a group, and there are five different applicable prediction algorithms, one of the five different algorithms is selected for each of the one hundred time series. It is to be understood that, for this specific illustrative example, a prediction algorithm is selected based on a determination of its applicability to a given time series based on reduced time in providing a forecast and improved accuracy of a forecast.

In one embodiment, the time series data sets have varying levels of sparsities. As a specific illustrative example, a time series is dense when transactions are generated hourly and is sparse when transactions are generated weekly. In one embodiment, time series are grouped by sparsity levels as discussed further below with respect to FIGS. 7 and 8. In one embodiment, an appropriate model is chosen based on a sparsity level grouping. In one embodiment, sparsity level groupings define subsets of time series. As a specific illustrative example, a first grouping may be low sparsity, a second grouping may be medium sparsity, and a third grouping may be high sparsity. In one embodiment, a model is chosen based on the appropriateness of a model to a grouping of a time series. In one embodiment, there are over a million sets of time series, and a respective prediction algorithm is selected from a set of algorithms to be applied to each set of time series, where each grouping of time series includes time series that are consistent with each other.

In one embodiment, a model includes a prediction algorithm and a transformation. In one embodiment, given a time series, a transformation can be applied to the given time series and a prediction algorithm can be applied to predict the future. It is to be understood that the complexity of selecting a model is increased due to the complexity of choosing both an appropriate transformation and an appropriate prediction algorithm.

In one embodiment, a model is chosen with the aid of knowledge insight. As a specific illustrative example, it may be known that a subset of prediction algorithms and a subset of transformations provide improved performance based on a certain type of time series. In one embodiment, a meta-modeling approach is supplemented with a data store of expert knowledge.

In one embodiment, different customized models are utilized to forecast each set of time series having certain characteristics. In one embodiment, the meta-model training system 120 trains meta-models for time series forecasting based on certain characteristics, such as sparsity of the time series. In one embodiment, the meta-model training system 120 trains meta-models based on a combination of improving accuracy and decreasing time to perform training, as reflected in the complexity of a computation.

In one embodiment, model knowledge is incorporated into the model selection method. It is to be understood that model knowledge may be acquired via a machine learning model or an expert user, for example. In one embodiment, model knowledge supplements the meta-model training system 120. As a specific illustrative example, model knowledge includes knowledge that a certain specific type of model performs well for a certain specific type of time series. In one embodiment, model knowledge is reflected as an expert penalty. In one embodiment, the meta-model training system 120 incorporates an expert penalty into the meta-model training. As a specific illustrative example, if a time series has characteristics that are smooth and periodic, model knowledge may include that composition-based algorithms perform well with such time series. In this example, such smooth and periodic time series may be evaluated and grouped together, and model knowledge can ensure that the composition-based algorithms are examined rather than examining all of the available prediction algorithms. In this example, the meta-model training system 120 utilizes, for such smooth and periodic time series, an expert penalty applied to examining the prediction algorithms that are not associated with composition-based algorithms.

In one embodiment, dynamic model selection includes choosing a model based on various properties of the data, such as sparsity. It is to be understood that a model is selected based on other properties in addition to sparsity, including percent nonzero values, periodicity metrics, number of peaks, length of time series, seasonality metrics, anomalies detected, and/or any other suitable properties. It is to be further understood that, for a financial transaction management domain, a model is selected based on other properties related to financial transactions including the types of time series of the transaction stream, the types of institutional accounts a transaction stream is received from, the types of transactions involved for a transaction stream, company demographics such as industry, geography, age of company, annual sales and number of employees, and/or any other suitable financial transaction management domain properties.

In one embodiment, the time series are grouped based on one or more properties. In one embodiment, a prediction algorithm is selected for each time series group. It is to be understood that, in one embodiment, a selected prediction algorithm has better results for certain time series having certain properties. As a specific illustrative example, if a time series group has a property of low sparsity, then a typical prediction algorithm will predict many zeros due to the sparseness of the time series. In this specific illustrative example, a typical prediction algorithm may provide an adequate prediction for a different time series group based on a dense seasonality property. In one embodiment, the meta-model training system 120 trains a meta-model based on a plurality of groups of time series in relation to a plurality of models.

In one embodiment, the time series data are grouped based on sparsity of each time series group. It is to be understood that variations in sparsity and other properties can impair the performance of a given model, and thus, in one embodiment, a model is chosen that is an improvement in performance for a particular time series group. In one embodiment, selecting a proper model to fit a particular group of time series data improves speed of calculations, reduces complexity of calculations, and reduces processing cost of calculations. In one embodiment, a model is selected that utilizes the pattern of the time series, such as a seasonality pattern of the time series, a sparsity pattern of the time series, and/or any other suitable patterns. In one embodiment, a model is selected that is applicable to a time series to improve the accuracy of predictions due to the model being particularly suited to the type of time series. In one embodiment, models are selected mathematically, such as avoiding the selection of autoregressive models for sparse data. In one embodiment, a mathematical selection excludes models from a model search, resulting in a faster solution.

In one embodiment, the meta-model training system 120 generates a meta-model decision graph based on time series training data. In one embodiment, the model selection system 130 selects the best possible forecasting algorithm based on the meta-model decision graph. In one embodiment, the prediction system 140 applies the selected forecasting algorithm to current time series data. In one embodiment, time series data comprises an event stream. In one embodiment, an event is represented as a data point occurring in time, and an event stream is a stream of events. As a specific illustrative example, an event stream is a collection of transactions that are received over different points of time. In one embodiment, time series data comprises time varying data, in which data varies over time.

In one embodiment, the meta-model training system 120 dynamically adapts to time series data that changes over time. In one embodiment, dynamic adaptation comprises adaptively selecting a model based on changing time series data. In one embodiment, dynamic model selection provides for time series forecasting of a set of time series with varying attributes through the development of a meta-algorithm. Such a meta-algorithm automatically provides forecasts for millions of time series, which would not be practicable for a human expert to accomplish due to the case-by-case analysis that would be required for a human expert to select an appropriate model for millions of time series.

Embodiments of the present disclosure provide highly efficient, effective, and versatile systems and methods for time series forecasting. However, the disclosed embodiments do not encompass, embody, or preclude other forms of innovation in the area of dynamic model selection systems and methods, and therefore do not monopolize the field of model selection.

In addition, the disclosed embodiments of systems and methods for time series forecasting are not abstract ideas for at least several reasons.

First, the disclosed systems and methods for time series forecasting are not abstract ideas because they are not merely an idea itself (e.g., mental processes that can be performed mentally or using pen and paper). For example, it is not possible for the human mind to comprehend all the permutations of possible models that could be selected for each of millions of time series data sets. In contrast, the disclosed embodiments train a meta-model to select the most suitable model for a given time series. Due to the complexity of the variability of the time series, a human mind cannot select an efficient model even with the aid of pen and paper.

Second, the disclosed systems and methods for time series forecasting are not abstract ideas because they are not a method of organizing human activity such as fundamental economic principles or practices (including hedging, insurance, mitigating risk); commercial or legal interactions (including agreements in the form of contracts; legal obligations; advertising, marketing or sales activities or behaviors; business relations); and managing personal behavior or relationships or interactions between people (including social activities, teaching, and following rules or instructions). In contrast, the disclosed embodiments provide for the selection of a model comprising a transform and an algorithm, which enables a prediction to be made for a user associated with a specific time series. Providing predictions for a user, using the disclosed embodiments, increases loyalty to the data service provider because users become reliant on future forecasts in order to enhance management of a user's business. This results in more efficient data and transaction management services of the data management service provider, according to one embodiment. The disclosed embodiments improve a user's receipt of forecasting information based on the user's own time series, which is not organizing human activity.

Further, the disclosed systems and methods are, in one embodiment, a mechanism to improve the accuracy of forecasts. Under a traditional data management system, a single model would be chosen for every time series. Such homogenous treatment, with a traditional data management system, causes inaccuracies in forecasting of time series that are diverse to the other time series, resulting in inefficiencies for users using such traditional data management systems to receive forecasts. In contrast, the disclosed embodiments provide for improving the accuracy of time series forecasting for specific time series of specific users. Such does not organize the human activity of a user, but rather enables the user to expediently receive forecasts that are relevant to the user.

Third, although mathematics may be used in the disclosed systems and methods for time series forecasting, the disclosed and claimed systems and methods are not abstract ideas because they are not simply a mathematical relationship/formula. In contrast, utilization of the disclosed embodiments results in the tangible effect of reduced use of processor workloads, memory, bandwidth, and power consumption associated with improved selection of a model that improves the speed of calculating forecasts on specific time series of specific users. Consequently, computing and communication systems implementing or providing the embodiments of the present disclosure are transformed into more operationally efficient devices and systems, resulting in reduced system resources and costs.

The disclosed systems and methods describe a practical application to improve the art of model selection by providing a technical solution to the technical problem of forecasting diverse time series of data management systems.

Exemplary Environment

Figure 2:
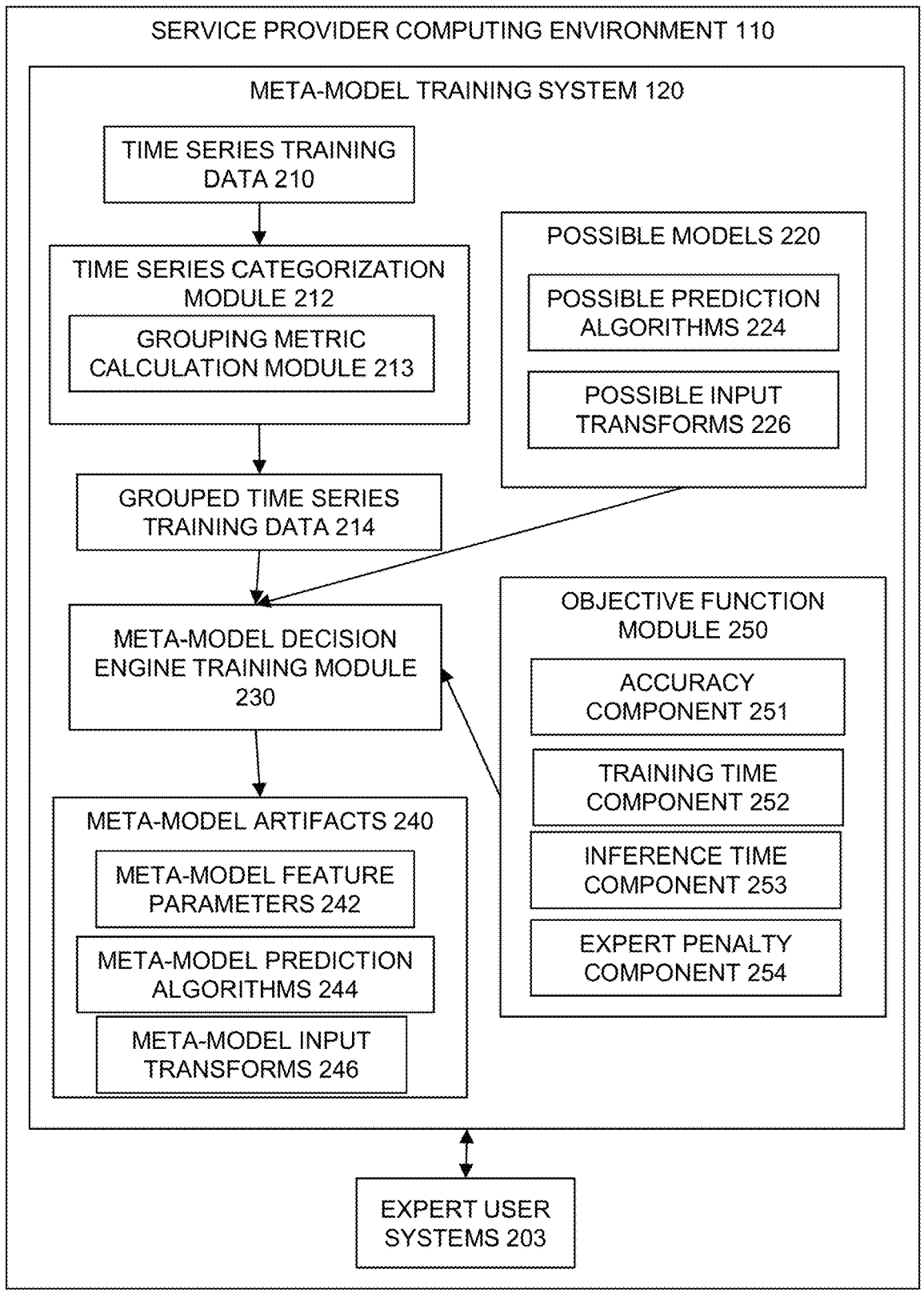
FIG. 2 is a functional block diagram of a meta-model training system for time series forecasting, in accordance with one embodiment.

FIG. 2 is a functional block diagram of a meta-model training system 120 for time series forecasting, in accordance with one embodiment. It is to be understood that the diagram of FIG. 2 is for exemplary purposes and is not meant to be limiting. Referring to FIGS. 1 and 2 together, in this specific illustrative example, the production environment 100 includes a service provider computing environment 110, which includes a meta-model training system 120 and expert user systems 203. In one embodiment, the meta-model training system 120 trains a meta-model to output a suitable model for a time series. In one embodiment, the input to the meta-model is time series data categorized into groups by properties such as sparsity. In one embodiment, the meta-model training system 120 trains the meta-model based on the grouped time series data sets. In one embodiment, the output of a meta-model is a model, which is a machine learning model.

The expert user systems 203 correspond to systems of various expert users of the meta-model training system 120. The expert users of the meta-model training system 120 utilize the expert user systems 203 to interact with the meta-model training system 120. In one embodiment, the expert users of the meta-model training system 120 can use the expert user systems 203 to interact with the time series categorization module 212, the possible models 220, the objective function module 250, the meta-model decision engine training module 230, and the meta-model artifacts 240.

In one embodiment, the meta-model training system 120 receives time series training data 210. In one embodiment, the time series training data 210 is received from the data management system 150. It is to be understood that, under one embodiment, time series training data includes any suitable sequence data. In one embodiment, the time series categorization module 212 groups the time series training data 210 into grouped time series training data 214 comprising sets of time series data, as discussed further below with respect to FIG. 9. In one embodiment, the time series categorization module 212 determines a categorization for a time series of the time series training data 210. In one embodiment, the time series categorization module 212 determines a categorization value of the time series of the time series training data 210. In one embodiment, a categorization value determines a property of the time series, such as sparsity.

As a specific illustrative example, a time series may combine transactions that have occurred over time, and a categorization value can be determined that counts the number of transactions in the past, which can determine sparsity. As another specific illustrative example, a categorization value can be determined that indicates whether or not a time series comprises data that is periodic. In one embodiment, categorization values are determined based on the properties of the time series. In one embodiment, properties of the times series are divergent, such as some time series having a dense property and some time series having a sparse property. In one embodiment, time series are divergent based on degrees of a property attribute, such as degrees of temporal sparsity across millions of time series. Variations in degrees of sparsity is known to be especially prevalent within financial transactions, such as forecasting cash flows. As a specific illustrative example, utilizing the disclosed embodiments, cash flow forecasts can be provided to millions of users, each having divergent cash flows represented as time series.

In one embodiment, the meta-model training system 120 consumes a large number of time series. In one embodiment, the large number of time series are not homogenous based on at least one property. In one embodiment, the large number of time series is for a particular domain. In one embodiment, the large number of time series form training data for a meta-model. In one embodiment, metrics are utilized to characterize the training data. As a specific illustrative example, if the training data is diverse within the property of sparsity, then a metric of topological entropy may be utilized to characterize the input time series into a plurality of groups. It is to be understood that a characterization and a metric is modifiable based on the domain data that is consumed.

In one embodiment, the time series categorization module 212 receives the time series training data 210 and categorizes the degree of sparsities for each time series of the time series training data 210. In one embodiment, the time series categorization module 212 generates grouped time series training data 214 based on the categorizations. In one embodiment, the time series categorization module 212 categorizes time series based on a topological entropy metric. In one embodiment, a grouping metric calculation module 213 of the time series categorization module 212 calculates grouping metrics to group time series training data 210. In one embodiment, a grouping metric is a topological entropy metric. In one embodiment, a topological entropy metric is calculated, as is known by one skilled in the art. Utilizing topological entropy metrics in one embodiment, the time series training data 210 is categorized into grouped time series training data 214.

In one embodiment, a metric is a threshold that separates different groups of time series data. In one embodiment, a threshold is based on the business requirements suited to a particular domain, such as the requirements of a domain software application. In one embodiment, a threshold is a hyperparameter. In one embodiment, a plurality of different time series is characterized by applying different metrics, such as topological entropy. In one embodiment, a metric will provide a numeric output. In one embodiment, a numeric output could vary over a range. In one embodiment, the variance of a range of a numeric output of a metric is utilized to define the categorization of the grouped time series training data 214. In one embodiment, a threshold value is determined by a machine learning model. In one embodiment, a threshold is determined by an expert user.

As a specific illustrative example, the time series training data 210 may be categorized by the time series categorization module 212 into three groups of grouped time series training data 214. In this example, a first group may be categorized as highly sparse, a second group may be categorized as partially sparse, and a third group may be categorized as not sparse. In this example, a threshold of the numeric scale of the metric separates such three exemplary groups.

In one embodiment, a threshold is mathematically derived. In one embodiment, a value of topological entropy defines a level of sparsity. It is to be understood that topological entropy is a measure of sparsity. In one embodiment, let a time series be x(t) and let $[L_i, U_i]$ be an interval, where $x(t) \in U_i[L_i, U_i]$ with respect to the Lebesgue measure: $f_i = \int_{-\infty}^{\infty} x(t) x_{[L_i, U_i]}(x(t)) dt$, where $\chi$ is the characteristic function. In this embodiment, a probability distribution can be defined as $p_i = f_i / \Sigma_i f_i$. In this embodiment, the topological entropy of the time series is defined as $H = -\Sigma_i p_i \log p_i$.

In one embodiment, the topological entropy is based on the probability distribution of time series data. Such a metric determines the flatness of the probability distribution of the time series data. As a specific illustrative example, a smaller number of events or repeated events of similar value would predicate a smaller value of an entropy metric. As another specific illustrative example, a relatively higher number of events comprising variation among the value of events would result in the entropy value being higher. It is to be understood that, in one embodiment, the smaller the value of the entropy, then the sparser the time series.

As a specific illustrative example, while forecasting transaction streams from users of the data management system 150, it is often encountered that such transaction streams have varying sparsity properties. In this example, some of the transaction streams may be relatively continuous and non-sparse. In this example, however, some transaction streams may be very sparse and discontinuous. In one embodiment, the relative difference in the sparsity of such transaction streams is addressed while modeling. As a specific illustrative example, temporal regression time models may be applied for sparse transaction streams and auto-regression type models may be applied for non-sparse transaction streams.

In one embodiment, the time series training data 210 comprises varying levels of an attribute, such as sparseness. In one embodiment, the varying levels of an attribute provides information that is utilized to customize a model that is selected. In one embodiment, a meta-model is generated for each group of the grouped time series training data 214. In one embodiment, each group is categorized based on a property, such as a sparsity property. In one embodiment, any other suitable attributes are utilized to group the grouped time series training data 214. As a specific illustrative example, a meta-model is generated for each group that is categorized for sparsity properties. In one embodiment, a meta-model is utilized to select from different time series. In one embodiment, a meta-model is trained by the meta-model decision engine training module 230. In one embodiment, a meta-model learns from the meta-model decision engine training module 230.

In one embodiment, the trained meta-model is saved as a meta-model artifact 240. In one embodiment, the meta-model artifact 240 is utilized to select a particular model. In one embodiment, after the particular model is selected, a prediction is determined based on the selected model.

In one embodiment, a group of the grouped time series training data 214 is associated with at least one possible model of the possible models 220. In one embodiment, a possible model 220 comprises a possible prediction algorithm 224 and a possible input transform 226. In one embodiment, a plurality of possible prediction algorithms 224 and a plurality of possible input transforms 226 can be applied to each group of the grouped time series training data 214, and a meta-model is built for each group of the grouped time series training data 214. In one embodiment, mathematical knowledge of the time series training data 210 is utilized to limit a search of the possible prediction algorithms 224 and the possible input transforms 226 in each group.

In one embodiment, one or more input transforms of the possible input transforms 226 improves the predictive accuracy of a subsequent prediction algorithm of the possible prediction algorithms 224, which is utilized to make a prediction into the future. In one embodiment, input data is transformed utilizing a possible input transform 226. As a specific illustrative example, a possible input transform 226 is utilized to transform input data into a cumulative time series, normalize data granularity of the timeframe of the data such as daily, monthly, quarterly, and yearly, and/or apply any other suitable transformations. In one embodiment, a static transform is applied to received time series data. In one embodiment, static transforms include smoothing, changing the time scale, other scaling, and/or any other suitable static transformations. It is to be understood that, in one embodiment, a first input transform may be applied to time series data to generate first transformed time series data, and then a second input transform may be applied to the first transformed time series data to generate second transformed time series data. It is to be further understood that, in one embodiment, any number of input transforms may be sequentially applied to time series data.

In one embodiment, applying a transform of the possible input transforms 226, the accuracy of an algorithm of the possible prediction algorithms 224 will improve. As a specific illustrative example, a model can be considered as two steps for highly sparse data. In this example, a first step is applying a transform to a group of highly sparse time series data. Then, in this example, a second step is applying a prediction algorithm to the transformed group of highly sparse time series data. For this specific illustrative example, by determining the most applicable transform and algorithm for a group of time series, the search space for such a grouped time series is reduced. In one embodiment, the most applicable model of transform and algorithm is determined that leads to improved accuracy, reduced training time, reduced inference time, and/or any other suitable improvements.

In one embodiment, a model of the possible models 220 is a combination of a transform of the possible input transforms 226 and an algorithm of the possible prediction algorithms 224. As a specific example, there may be a hundred time series, and there could be ten possible transforms that could be applied to those one hundred time series and there could be ten possible algorithms that could be applied to those one hundred time series. In this example, a selected model would comprise a combination of a selected transform of the ten possible transforms and a selected algorithm of the ten possible algorithms. In this specific illustrative example, it is to be understood that there are one hundred combinations of the ten transforms and the ten algorithms. It is to be understood that, in one embodiment, the selection of a transform can improve the performance of a prediction algorithm. It is to be further understood that, in one embodiment, two or more possible input transforms 226 can be combined to create an additional possible input transform 226. In one embodiment, model knowledge can be utilized to guide the selection of a transform, such as through a data store of expert penalties. In one embodiment, expert penalty data is received via an expert user system 203 communicatively coupled to the meta-model training system 120.

In one embodiment, a combination of prediction algorithms and input transforms are trained for each time series data set. As a specific illustrative example, if there are four different prediction algorithms and three different transforms, then there are twelve models that will be trained for each time series data set. It is to be understood that this example is not meant to be limiting, and that there may be any number of transforms and any number of prediction algorithms. In one embodiment, if the data that is input is not in the form of a time series, then a transform is applied to convert the input data into the form of a time series. As a specific illustrative example, if the input data is so sparse that it does not resemble a time series, then it can be transformed with an input transform to convert the input data into a time series. As a specific illustrative example, input data may be indexed by day or week to convert the input data into a time series format.

In one embodiment, after input data is transformed, a prediction algorithm is applied. It is to be understood that the term prediction algorithm is not limiting and can include any other suitable predictive methods on sequence data. In one embodiment, after input data is transformed with a transform, then a prediction algorithm is applied to the transformed data to predict the time series.

In one embodiment, after input data is consumed, model combinations of prediction algorithms and input transforms are generated from which the meta-model will choose. In one embodiment, given a certain number of transforms in combination with a certain number of prediction algorithms, the product of the number of transforms and the number of prediction algorithms is available from which to select for any given input time series.

In one embodiment, the meta-model decision engine training module 230 trains the meta-model. In one embodiment, the data set that is used for training by the meta-model decision engine training module 230 are the possible models 220 comprising the combinations of possible prediction algorithms 224 and possible input transforms 226. In one embodiment, machine learning is used to determine which model of the possible models 220 is best to apply to a time series. In one embodiment, machine learning includes artificial intelligence operations, regression, logistic regression, decision trees, artificial neural networks, support vector machines, linear regression, nearest neighbor methods, distance based methods, naive Bayes, linear discriminant analysis, k-nearest neighbor algorithm, another query classifier, and/or any other suitable machine learning operations.

In one embodiment, metrics are utilized to determine the best model combination of a prediction algorithm and a transform. In one embodiment, metrics inform the meta-model of the correct combination. In one embodiment, metrics are utilized to train a meta-model. In one embodiment, the meta-model decision engine training module 230 utilizes a training metric calculation to train a meta-model stored as a meta-model artifact 240. In one embodiment, meta-model artifacts 240 comprise meta-model feature parameters 242 derived by the meta-model decision engine training module 230 from the grouped time series training data 214, meta-model prediction algorithms 244 derived by the meta-model decision engine training module 230 from the possible prediction algorithms 224, and meta-model input transforms 246 derived by the meta-model decision engine training module 230 from the possible input transforms 226.

In one embodiment, a metric is utilized to choose the best combination of transform and prediction algorithm for each grouping of input data. In one embodiment, an objective function module 250 is utilized to calculate a training metric. In one embodiment, a training metric calculates the accuracy of a model, the training time of a model, the inference time of a model, and/or any other suitable calculations.

In one embodiment, a weighted sum of training metrics is calculated. In one embodiment, a weighted sum of training metrics is utilized to provide fast and accurate predictions. In one embodiment, a transform and a prediction algorithm are identified for each set of time series based on the weighted sum of metrics. In one embodiment, the weighted sum of metrics provides labels for the training data. In one embodiment, an objective function module 250 calculates the weighted sum of metrics. In one embodiment, the objective function module 250 is utilized by the meta-model decision engine training module 230 as a multiclass classification problem in order to determine the appropriate input transform and prediction algorithm for a time series. In one embodiment, a weighted sum is determined to create labels for a training set, the training set is generated, the training set is treated as a classification problem, and the meta-model is trained.

In one embodiment, the objective function module 250 specifies lambdas ($\lambda$) of an objective function. In one embodiment, an objective function is represented as $-\lambda 1 *$Accuracy$+\lambda 2 *$Training Time$+\lambda 3 *$Inference Time$+\lambda 4 *$Expert Penalty. In one embodiment, the objective function is to be minimized.

In one embodiment, the objective function comprises four components. A first component of the objective function is the accuracy component 251. In one embodiment, accuracy can be defined through a metric such as mean absolute scaled error (MASE), root mean squared error (RMSE), normalized root mean square error (NRMSE), log likelihood, a Brier score, and/or any other suitable accuracy metrics.

A second component of the objective function is the training time component 252. In one embodiment, training time is represented as the average time elapsed to train a specific model under a specific hardware configuration for a set of time series with a specific set of characteristics.

A third component of the objective function is the inference time component 253. In one embodiment, inference time is represented as the average time elapsed to generate a specific model under a specific hardware configuration with a specific set of characteristics.

A fourth component of the objective function is the expert penalty component 254. In one embodiment, an expert penalty enables an expert user to incorporate the expert's knowledge into a model. As a specific illustrative example, an expert user can add a penalty for using an auto-regressive model for a sparse time series.

In one embodiment, each lambda of the objective function is specified based on the relative priorities between the components of the objective function. In one embodiment, the lambdas are calculated based on a machine learning model to determine the optimal objective function solution. In one embodiment, an expert user determines a value for a lambda. In one embodiment, the components of the objective function are values relating to a particular model to yield a prediction algorithm for a set of time series that share similar characteristics. As a specific illustrative example, for a given model and for a given time series, there is a certain degree of accuracy that is measured, there is a certain amount of training time required, and there is a certain amount of inference time required, which are all measured. In one embodiment, an expert user additionally sets an expert penalty for the objective function. In one embodiment, an expert penalty excludes certain models. In one embodiment, an expert penalty penalizes certain models. As a specific illustrative example, an expert user may hold the belief that there are some characteristics that are not captured with the other components of the objective function, which the expert user either wants to avoid or pursue.

In one embodiment, the lambdas are optimized to relate to business outcomes. As a specific illustrative example, when a model is trained, there are certain monetary costs to computationally perform the training based on training time and inference time. As a further specific illustrative example, there are monetary costs to inaccuracy of a prediction based on loss of users due to prediction inaccuracies, as well as other business contexts to monetarily value accuracy. In one embodiment, monetary valuations are expressed in the objective function.

In one embodiment, the objective function enables the decrease in the amount of time and computational effort needed for producing accurate predictions for a plurality of time series, such as millions of time series. In one embodiment, the objective function aids in the selection of the proper model for a particular time series. In one embodiment, the objective function enables a balancing of costs in terms of the degree of accuracy of a model for a particular time series, the training time, and the inference time. As a specific illustrative example, accuracy may be prioritized above training time and inference time. As another specific illustrative example, training time may be prioritized above accuracy and inference time. In one embodiment, trade-offs between the components of the objective function are expressed through changing the values of the lambdas of the objective function.

In one embodiment, an objective function module 250 allows an expert user to guide the machine learning model selection training of the meta-model decision engine training module 230. In one embodiment, the objective function module 250 enables an expert user to guide the model selection based on statistical and mathematical principles. In one embodiment, the objective function module 250 incorporates the knowledge of an expert user through rules.

In one embodiment, for each time series, a training data set is generated. As a specific illustrative example, for a given time series, there may be four input transforms and four prediction algorithms. In this example, there are sixteen combinations of transforms and algorithms to be examined by the meta-model decision engine training module 230. In this example, for each of the sixteen combinations, and for each time series, an accuracy metric will be determined, a training time metric will be determined, and an inference time metric will be determined, and a weighted sum will be determined from such metrics. In this example, the weighted sum of the sixteen combinations is optimized. In this example, the lowest value for the weighted sum of each of the sixteen combinations is determined. In this example, one of the weighted sums of the sixteen combinations will have a lower value. In this example, the combination with the lowest weighted sum is selected as the model to be used for the particular input time series.

In one embodiment, labels are determined based on a weighted sum calculation. In one embodiment, for each time series of the grouped time series training data 214, the accuracy, training time, and inference time is calculated for all combinations of each transform of the possible input transforms 226 and each algorithm of the possible prediction algorithms 224. In one embodiment, an expert penalty is included in the calculations. In one embodiment, the calculation of a weighted sum of accuracy, training time, inference time, and expert penalty yields a numeric value. In one embodiment, the weighted sum with the lowest numeric value is determined to be associated with the model. In one embodiment, for a grouping of time series based on a classification, the model associated with the lowest weighted sum of metrics is labeled with the determined model of an input transform and a prediction algorithm.

In one embodiment, the training set is utilized by the meta-model decision engine training module 230 to determine a model based on a categorization, such as sparsity, of a given time series. In one embodiment, the determined model comprises a determined input transform and a determined prediction algorithm. In one embodiment, the training set is utilized to train a classification problem. In one embodiment, a machine learning approach is utilized with training data, labeled training data, and time series with particular properties. Given such, in one embodiment, a particular transform and a particular algorithm is determined that works efficiently with the group of time series. Given such, in one embodiment, a meta-model is trained. In one embodiment, a meta-model learns to determine a model of an input transform and a prediction algorithm.

In one embodiment, after the meta-model is trained, for a new time series that is not part of the training set, the new time series is compared to past time series as determined by the meta-model. In one embodiment, the new time series is categorized, such as by sparsity, and a model comprising an input transform and a prediction algorithm is determined. After the meta-model is trained, in one embodiment, it is utilized to make future selections of a model.

In one embodiment, a grouping of time series is associated with at least one feature. As a specific illustrative example, a grouping of time series may be based on a high level of sparsity. In this example, the search space is limited based on the labels associated with the grouping of time series. In this example, for each time series of the grouping, a label of a transform and a prediction algorithm is associated for the determined features of each highly sparse time series in the grouping.

In one embodiment, features are extracted from a time series. In one embodiment, a weighted sum is calculated based on the training metrics of an objective function. In one embodiment, based on the training metric calculations, a model label is determined of a transform and a prediction algorithm. In one embodiment, the model label is associated with the extracted features of the time series. In one embodiment, the features and the associated labels are utilized by the meta-model decision engine training module 230 to train a machine learning algorithm.

In one embodiment, the meta-model decision engine training module 230 generates the meta-model artifact 240 based on the grouped time series training data 214. In one embodiment, the meta-model artifact 240 is represented as a classification algorithm, a logistic regression approach, a decision graph, a decision tree, and/or any other suitable artifact representations. As a specific illustrative example, a meta-learning decision graph is generated based on a machine learning algorithm to select the appropriate prediction algorithm of the possible prediction algorithms 224.

In one embodiment, a general classification approach is utilized to learn the multi-class classification. In one embodiment, a classification algorithm is utilized to predict a model for a given time series. In one embodiment, the model prediction is based on the features associated with the time series that are input into the model. As a specific illustrative example, a decision tree is utilized for such a prediction.

In one embodiment, meta-models are trained based on the categorizations of the time series data. In one embodiment, a baseline decision graph is generated based on the trained meta-models. As a specific illustrative example, a decision tree is generated by the meta-model decision engine training module 230. In this example, the decision tree includes the features that are utilized by the model to select the transform and the prediction algorithm to be applied. In this example, a meta-model is built for model selection. In this example, an algorithm that is utilized to train the machine learning algorithm is a decision tree. In this example, the decision tree enables learning from input time series data. In this example, the meta-model decision engine training module 230 determines whether certain features are present. In this example, the meta-model decision engine training module 230 determines whether a certain feature of the input time series data is less than a particular value. In this example, the meta-model decision engine training module 230 determines other features with the traversal of the branch nodes of a decision tree, until a leaf node of the decision tree is reached. In one embodiment, the decision tree enables questions to be posed on the input data in order to determine an applicable model for the time series. In one embodiment, the decision tree is traversed through questions and answers of time series data to learn from the time series data. In one embodiment, a decision tree is utilized to determine the label for input time series data.

In one embodiment, a learned decision graph is editable. In one embodiment, an expert user system 203 enables the customization of a time series meta-model based on an expert user's domain knowledge and expertise. As a specific illustrative example, a meta-model is represented by a decision tree that can be modified. In this example, an expert user can modify a decision tree through modifying a branch node, removing a branch node, adding a branch node, modifying a leaf node such as changing the combination of an input transform and a prediction algorithm, and/or any other suitable decision tree modifications. In this example, a decision tree can be modified after it has been learned. In this example, model knowledge may be utilized to make modifications to the decision tree, such as when a model is no longer desired to be utilized. In this example, a logistic regression approach may be utilized, in which weights are learned. After such meta-model training, parameters of the meta-model can be modified based on model knowledge.

Figure 3:
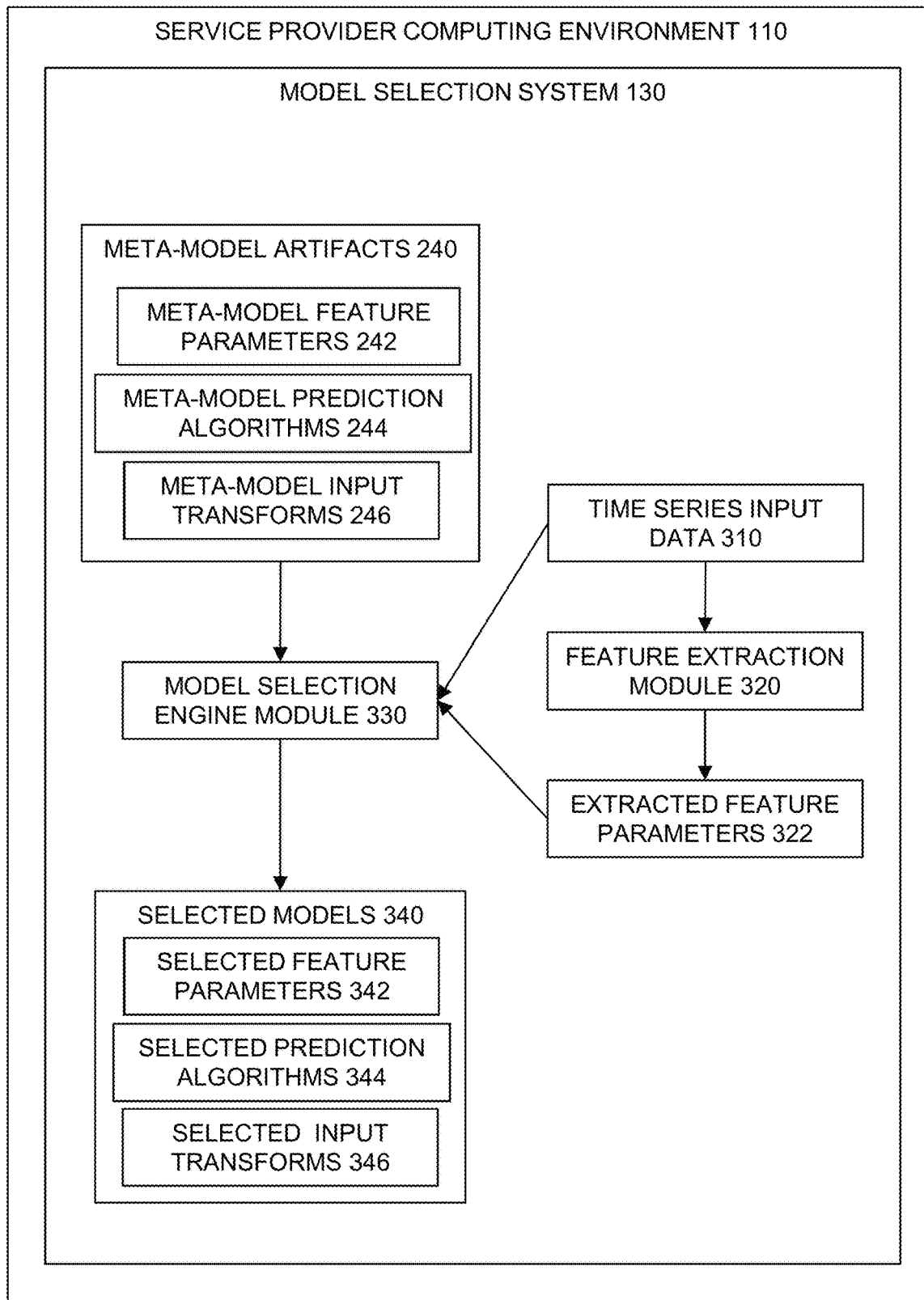
FIG. 3 is a functional block diagram of a model selection system for time series forecasting, in accordance with one embodiment.

FIG. 3 is a functional block diagram of a model selection system 130 for time series forecasting, in accordance with one embodiment. It is to be understood that the diagram of FIG. 3 is for exemplary purposes and is not meant to be limiting. Referring to FIGS. 1, 2, and 3 together, in this specific illustrative example, the production environment 100 includes a service provider computing environment 110, which includes a model selection system 130. In one embodiment, the model selection system 130 selects a model, which is a time series model that is a combination of a transform and a prediction algorithm.

In one embodiment, the model selection system 130 receives time series that are utilized for selecting a model. In one embodiment, the features of the received time series are extracted. In one embodiment, the meta-model trained by the meta-model training system 120 is utilized to predict a label for the received time series. In one embodiment, the label represents a model comprising an input transform and a prediction algorithm. In one embodiment, a model is selected based on the predicted label. It is to be understood that, utilizing the meta-model, the model selection system 130 predicts a label based on the calculated labels of the meta-model training system 120.

In one embodiment, the model selection system 130 receives time series input data 310 from the data management system 150. In one embodiment, the feature extraction module 320 extracts features from the time series input data 310. In one embodiment, the feature extraction module 320 extracts extracted feature parameters 322 from the time series input data 310.

In one embodiment, the model selection engine module 330 utilizes the meta-model artifact 240 that was trained by the meta-model decision engine training module 230. In one embodiment, the model selection engine module 330 selects a model based on the time series input data 310, the extracted feature parameters 322, and the meta-model artifact 240. In one embodiment, the model selection engine module 330 outputs the selected models 340. In one embodiment, the selected models 340 include selected feature parameters 342, selected prediction algorithms 344, and selected input transforms 346.

Figure 4:
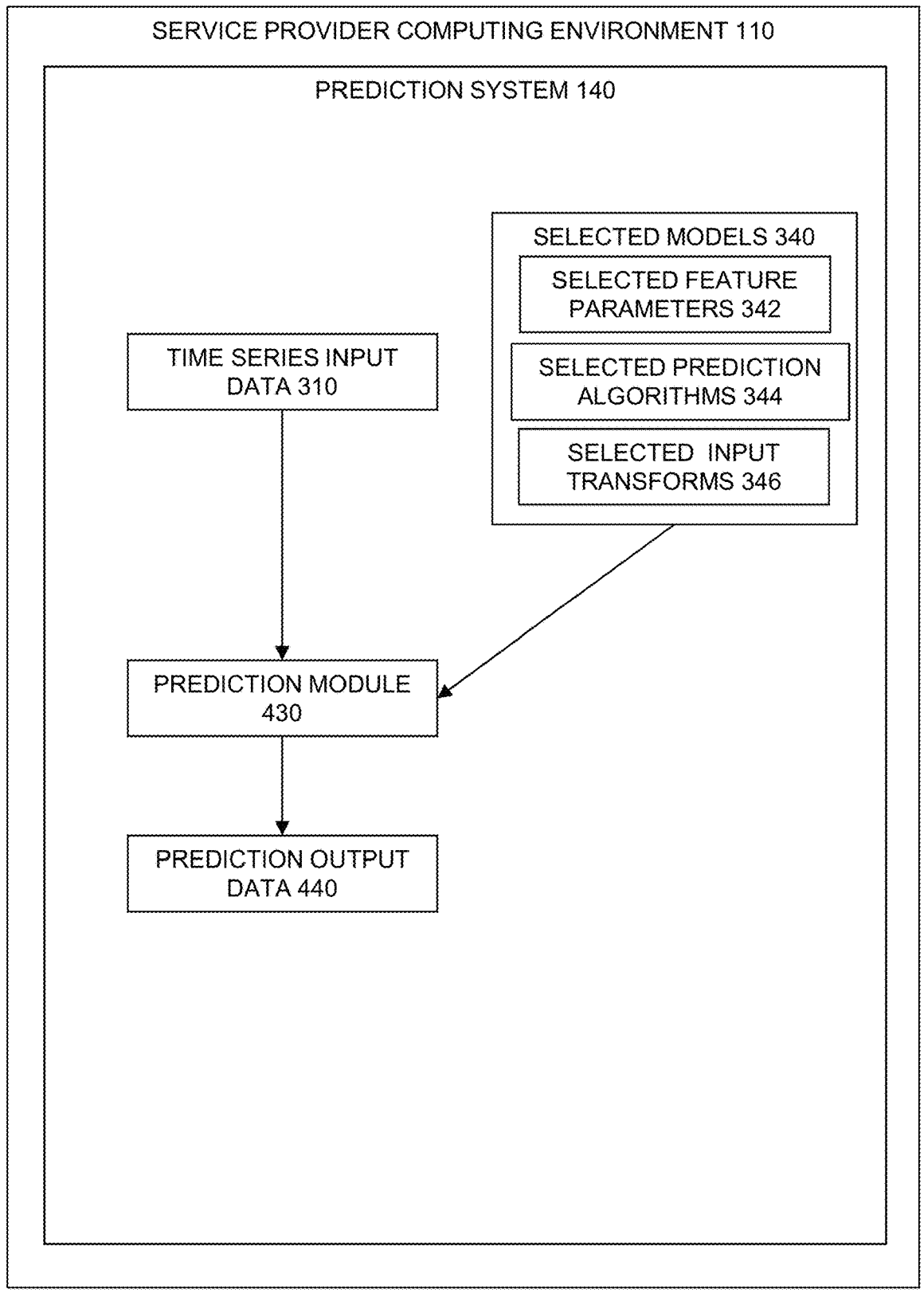
FIG. 4 is a functional block diagram of a prediction system for time series forecasting, in accordance with one embodiment.

FIG. 4 is a functional block diagram of a prediction system 140 for time series forecasting, in accordance with one embodiment. It is to be understood that the diagram of FIG. 4 is for exemplary purposes and is not meant to be limiting. Referring to FIGS. 1, 2, 3, and 4 together, in this specific illustrative example, the production environment 100 includes a service provider computing environment 110, which includes a prediction system 140. In one embodiment, a meta-model is built by the meta-model training system 120, a model of a transform and a prediction algorithm is selected by the model selection system 130 utilizing the meta-model, and then the selected model is applied to make an actual prediction by the prediction system 140. In one embodiment, the prediction system 140 makes a prediction based on the selected model that was selected by the model selection system 130.

In one embodiment, the prediction system 140 receives time series input data 310 that was received by the model selection system 130. In one embodiment, the prediction module 430 utilizes the selected models 340 that were generated by the model selection engine module 330. In one embodiment, the prediction module 430 generates a prediction based on the time series input data 310 and the selected models 340. In one embodiment, the prediction module 430 outputs the prediction output data 440. In one embodiment, the prediction output data 440 includes a prediction about at least one future value of the time series input data 310.

It is to be understood that, under one embodiment, the prediction system 140 generates a prediction based on characteristics of sequence data. As a specific illustrative example, the sequence data may be derived from time series of user transactions. In this example, characteristics of sparsity of such time series data is determined, which advantageously reduces the search space.

It is to be further understood that, under one embodiment, the prediction system 140 generates a prediction based on metrics that are optimized. As a specific illustrative example, optimized metrics may be accuracy based, training-time based, inference-time based, and expert-penalty based. In this example, the prediction system 140 achieves a balance between accuracy and speed of a model.

It is to be further understood that, under one embodiment, the prediction system 140 generates a prediction based on machine learning supplemented by model expertise. As a specific illustrative example, specific models are enforced for each grouping of time series data. In this example, certain models are enforced mathematically, such as with an objective function. In this example, an objective function can mathematically avoid autoregressive approaches for sparse data. In this example, an expert penalty is optimized to enforce certain models based on prior expert knowledge.

It is to be further understood that, under one embodiment, the prediction system 140 generates a prediction based on scale optimization. As a specific illustrative example, time series of enormous scale can be predicted. In this example, more than twenty million time series can be predicted. In this example, a time series could incorporate transactions over a year, two years, five years, and/or any other suitable time periods. In this example, the average monthly volume of time series transactions by account and/or category for a respective user may be 10, 15, and/or any other suitable average monthly volume based on varying time series. In this example, each time series may be based on a category of a time period of transactions as defined by each user of the data management system 150.

In one embodiment, a meta-model is trained and utilized to predict large time series data sets faster and more accurately based on comparing a plurality of models. In one embodiment, a meta-model is utilized to select a model to be applied to a time series from a production environment, such as the data management system 150.

Figure 5:
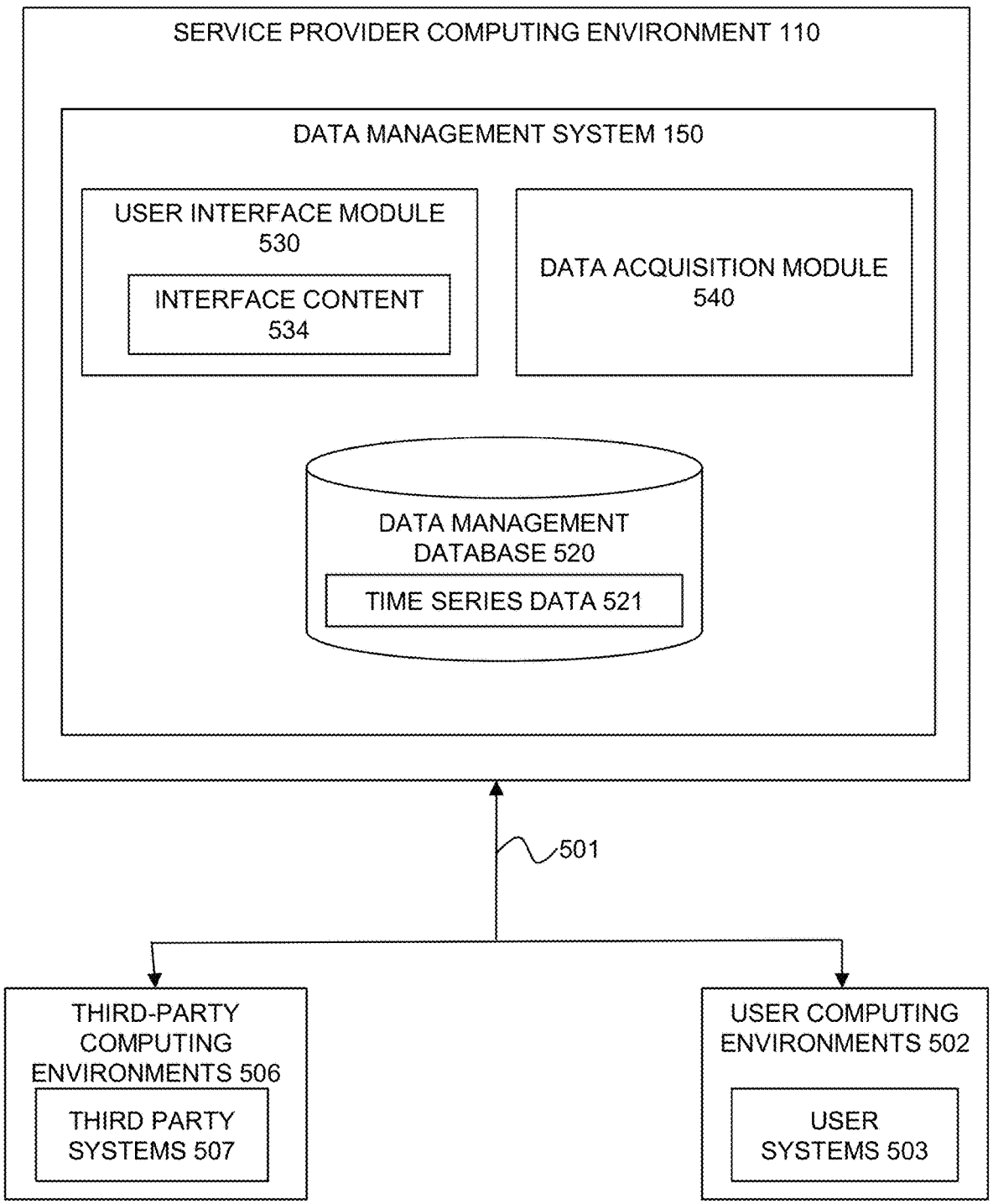
FIG. 5 is a functional block diagram of a data management system for time series forecasting, in accordance with one embodiment.

FIG. 5 is a functional block diagram of a data management system 150 for time series forecasting, in accordance with one embodiment. Referring to FIGS. 1, 2, 3, 4, and 5 together, in this specific illustrative example, the production environment 100 includes a service provider computing environment 110, user computing environments 502, and third-party computing environments 506, according to various embodiments. The computing environments 110, 502, and 506 are communicatively coupled to each other with one or more communication channels 501, according to various embodiments. The communication channels 501 may include one or more physical or virtual networks.

The service provider computing environment 110 includes the data management system 150, which is configured to provide data management services to a plurality of users, in one embodiment. According to one embodiment, the data management system 150 is an electronic financial accounting system that assists users in bookkeeping or other financial accounting practices. Additionally, or alternatively, the data management system 150 can manage one or more of banking, investments, loans, credit cards, real estate investments, retirement planning, bill pay, budgeting, regulation compliance, and/or any other suitable data. In one embodiment, the data management system 150 can be a standalone system that provides data management services to users. Alternatively, in one embodiment, the data management system 150 can be integrated into other software or service products provided by a service provider.

In one embodiment, the data management system 150 can assist users in tracking expenditures and revenues by retrieving time series data related to transactions of users. The data management system 150 may include a data acquisition module 540 and a user interface module 530, according to various embodiments.

The user computing environments 502 correspond to computing environments of the various users of the data management system 150. The user computing environments 502 may include user systems 503. The users of the data management system 150 utilize the user computing environments 502 to interact with the data management system 150. The users of the data management system 150 can use the user computing environments 502 to provide data to the data management system 150 and to receive data, including data management services, from the data management system 150.

In one embodiment, the user interface module 530 provides interface content 534 to the user computing environments 502. The interface content 534 can include data enabling a user to obtain the current status of the user's accounts. For example, the interface content 534 can enable the user to select among the user's accounts in order to view transactions associated with the user's accounts. The interface content 534 can enable a user to view the overall state of many accounts. The interface content 534 can also enable a user to select among the various options in the data management system 150 in order to fully utilize the services of the data management system 150.

In one embodiment, the data acquisition module 540 of the data management system 150 is configured to receive from the third-party computing environments 506 data associated with the user.

In one embodiment, the data management system 150 includes a data management database 520. The data management database 520 includes time series data 521. The time series data 521 may be derived from data indicating the current status of all of the accounts of all of the users of the data management system 150. Thus, the data management database 520 can include a vast amount of data related to the data management services provided to users. In one embodiment, when the user utilizes the user interface module 530 to view interface content 534, the interface content 534 includes the time series data 521 retrieved from the data management database 520. In one embodiment, the time series data 521 represents at least one transaction. In one embodiment, a transaction includes fields for user, merchant, category, description, date, amount, and/or any other suitable transaction fields. As a specific illustrative example, the time series data 521 may include cash flow transactions of a small business. In this example, the cash flow transactions may be transformed into time series varying on a time scale.

In one embodiment, the data acquisition module 540 is configured to use third-party authentication data to acquire time series data related to transactions of the users from the third-party systems 507 of the third-party computing environments 506. In addition, the data acquisition module 540 may use the third-party authentication data to log into the online services of third-party computing environments 506 of third-party institutions in order to retrieve time series data related to the transactions of users of the data management system 150. The data acquisition module 540 accesses the third-party institutions by interfacing with the third-party computing environments 506.

Exemplary Process

Figure 6:
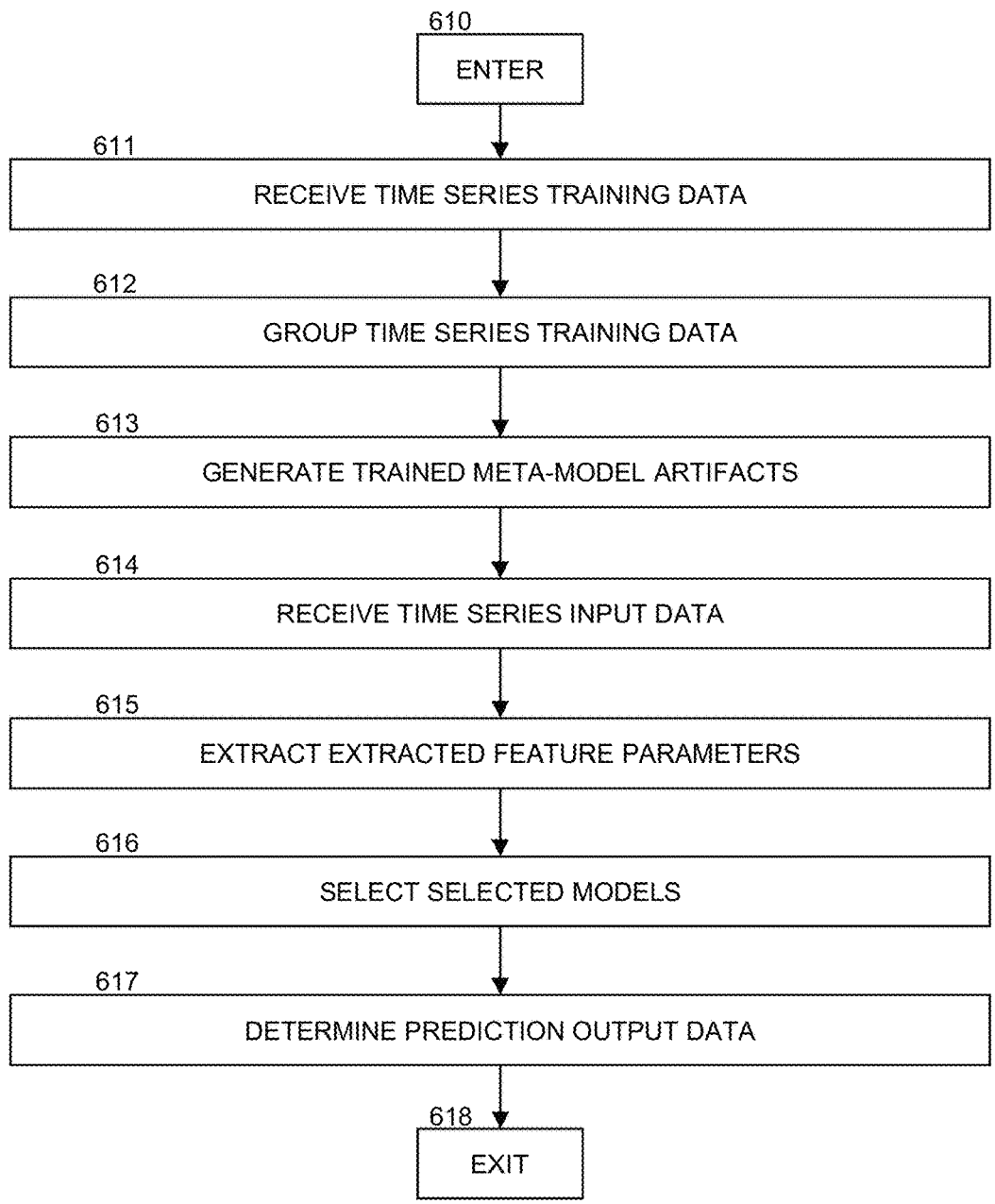
FIG. 6 is a flow diagram of a process for time series forecasting, in accordance with one embodiment.

FIG. 6 is a flow diagram of a process 600 for time series forecasting, in accordance with one embodiment. It is to be understood that the process 600 of FIG. 6 is for exemplary purposes and is not meant to be limiting. Referring to FIGS. 1, 2, 3, 4, 5, and 6 together, the process 600 for time series forecasting begins at ENTER OPERATION 610 and process flow proceeds to RECEIVE TIME SERIES TRAINING DATA OPERATION 611.

In one embodiment, at RECEIVE TIME SERIES TRAINING DATA OPERATION 611, time series training data 210 is received by the meta-model training system 120. In one embodiment, the time series training data 210 is received from first time series data 521 of the data management database 520 of the data management system 150.

In one embodiment, the plurality of time series training data 210 comprises a first time series data set and a second time series data set. In one embodiment, the first time series data set has a first categorization property that is diverse from a second categorization property of the second time series data set. It is to be understood that this embodiment is not meant to be limiting, and that there may be any number of time series data sets and any number of categorization properties.

In one embodiment, once the time series training data 210 is received at RECEIVE TIME SERIES TRAINING DATA OPERATION 611, process flow proceeds to GROUP TIME SERIES TRAINING DATA OPERATION 612.

In one embodiment, at GROUP TIME SERIES TRAINING DATA OPERATION 612, the time series training data 210 is grouped by the time series categorization module 212, as discussed further below with respect to FIG. 9. In one embodiment, the time series categorization module 212 utilizes the grouping metric calculation module 213 for the grouping. In one embodiment, the time series training data 210 is grouped into grouped time series training data 214 representing buckets of time series. In one embodiment, a time series categorization property is a sparsity property. In one embodiment, the plurality of time series training data is grouped based on a determination of topological entropy.

In one embodiment, once the grouped time series training data 214 is grouped at GROUP TIME SERIES TRAINING DATA OPERATION 612, process flow proceeds to GENERATE TRAINED META-MODEL ARTIFACTS OPERATION 613.

In one embodiment, at GENERATE TRAINED META-MODEL ARTIFACTS OPERATION 613, trained meta-model artifacts 240 are generated by the meta-model decision engine training module 230, as discussed further below with respect to FIG. 13. In one embodiment, the meta-model decision engine training module 230 trains the meta-model artifacts 240 with machine learning algorithms. In one embodiment, machine learning algorithms include, but are not limited to, artificial intelligence operations, regression, logistic regression, decision trees, artificial neural networks, support vector machines, linear regression, nearest neighbor methods, distance based methods, naive Bayes, linear discriminant analysis, k-nearest neighbor algorithm, another query classifier, and/or any other suitable machine learning algorithms.

In one embodiment, the meta-model decision engine training module 230 utilizes possible models 220 for its learning. In one embodiment, the possible models 220 include combinations of possible prediction algorithms 224 and possible input transforms 226. In one embodiment, the meta-model decision engine training module 230 utilizes an objective function module 250. In one embodiment, an objective function includes an accuracy component 251, a training time component 252, an inference time component 253, and an expert penalty component 254. In one embodiment, the expert penalty component is based on expert penalty data received from an expert user system 203. In one embodiment, the expert penalty data penalizes a possible input transform 226. In one embodiment, the expert penalty data penalizes a possible prediction algorithm 224.

In one embodiment, the meta-model artifacts 240 comprise associations of meta-model feature parameters 242, meta-model prediction algorithms 244, and meta-model input transforms 246. In one embodiment, the meta-model artifacts 240 are represented by decision graphs. In one embodiment, the decision graphs are decision trees. In one embodiment, the meta-model artifacts 240 are generated by using model label tables.

In one embodiment, once the trained meta-model artifacts 240 are generated at GENERATE TRAINED META-MODEL ARTIFACTS OPERATION 613, process flow proceeds to RECEIVE TIME SERIES INPUT DATA OPERATION 614.

In one embodiment, at RECEIVE TIME SERIES INPUT DATA OPERATION 614, a plurality of time series input data 310 is received by the model selection system 130. In one embodiment, the plurality of time series input data 310 is received from second time series data 521 of the data management database 520 of the data management system 150.

In one embodiment, once time series input data 310 is received at RECEIVE TIME SERIES INPUT DATA OPERATION 614, process flow proceeds to EXTRACT EXTRACTED FEATURE PARAMETERS OPERATION 615.

In one embodiment, at EXTRACT EXTRACTED FEATURE PARAMETERS OPERATION 615, extracted feature parameters 322 are extracted from the time series input data 310 by the feature extraction module 320, as discussed further below with respect to FIG. 12.

In one embodiment, once extracted feature parameters 322 are extracted at EXTRACT EXTRACTED FEATURE PARAMETERS OPERATION 615, process flow proceeds to SELECT SELECTED MODELS OPERATION 616.

In one embodiment, at SELECT SELECTED MODELS OPERATION 616, a plurality of selected models 340 are selected by the model selection engine module 330. In one embodiment, the model selection engine module 330 selects the plurality of selected models 340 based on the meta-model artifacts 240, the time series input data 310, and the extracted feature parameters 322, as discussed further below with respect to FIGS. 10 and 11.

In one embodiment, once the selected models 340 are selected at SELECT SELECTED MODELS OPERATION 616, process flow proceeds to DETERMINE PREDICTION OUTPUT DATA OPERATION 617.

In one embodiment, at DETERMINE PREDICTION OUTPUT DATA OPERATION 617, prediction output data 440 is determined by the prediction module 430. In one embodiment, the prediction module 430 makes predictions based on the time series input data 310 and the selected models 340. In one embodiment, the selected models 340 comprise associations of selected feature parameters 342, selected prediction algorithms 344, and selected input transforms 346. In one embodiment, the time series input data 310 is transformed by the selected input transforms 346 and then the selected prediction algorithms 344 are applied to the transformed time series input data 310 to form the prediction output data 440. In one embodiment, the prediction output data 440 is delivered to the respective user systems 503.

In one embodiment, prediction output data 440 is delivered to the data management system 150. In one embodiment, the data management system 150 performs an action based on the prediction output data 440. As a specific illustrative example, if the prediction output data 440 represents predictions about inventory levels for a manufacturer, then the data management system 150 may generate inventory replenishment data representing a request to a respective supplier for an order of additional inventory based on a forecast of low inventory for a respective user of the data management system 150. As another specific illustrative example, if the prediction output data 440 represents predictions about cash flow, then the data management system 150 may generate capital funding data representing a transfer of a pre-approved monetary loan amount to overcome forecasted cash flow shortfalls of a respective user of the data management system 150. As another specific illustrative example, if the prediction output data 440 represents predictions about cloud computing environment workloads, the data management system 150 may reallocate the cloud computing environment resources, such as memory, based on such predictions. It is to be understood that such examples of actions taken by the data management system 150 are not meant to be limiting, and that the data management system 150 can take any other suitable actions based on the prediction output data 440.

In one embodiment, once the prediction output data 440 is determined at DETERMINE PREDICTION OUTPUT DATA OPERATION 617, process flow proceeds to EXIT OPERATION 618.

In one embodiment, at EXIT OPERATION 618, the process 600 for time series forecasting is exited.

Figure 7:
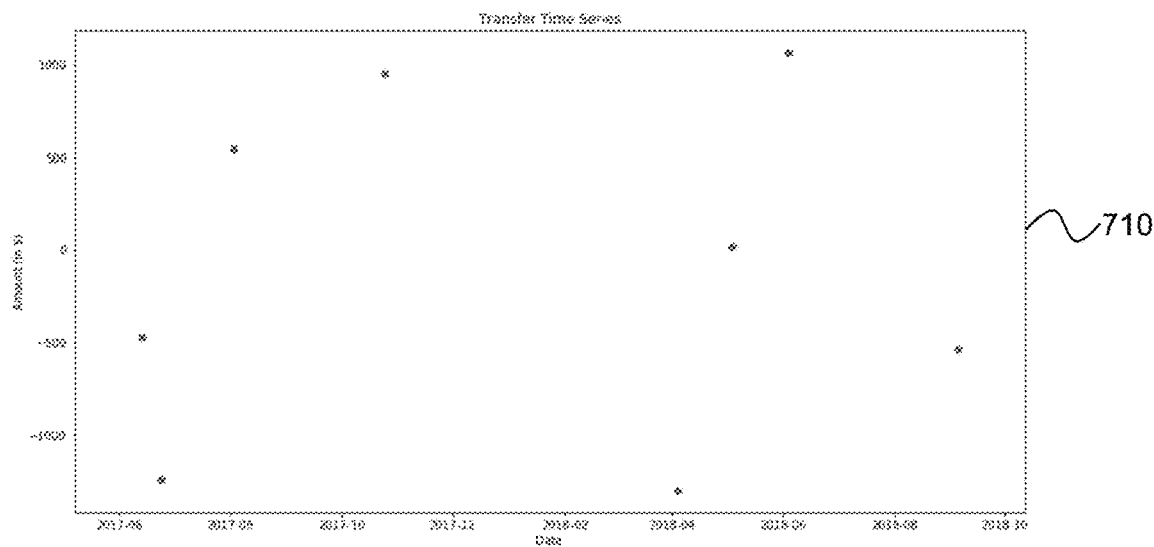
FIG. 7 is a specific illustrative chart of sparsity for time series forecasting, in accordance with one embodiment.

FIG. 7 is a specific illustrative chart 700 of sparsity for time series forecasting, in accordance with one embodiment. FIG. 7 illustrates a first time series chart 710 associated with transfers, which depicts high sparsity. As illustrated in the first time series chart 710, a time series having a high sparsity property has fewer data points over time. In this specific illustrative example, the first time series chart 710 represents transfer of funds between accounts, which tends to be less frequent.

Figure 8:
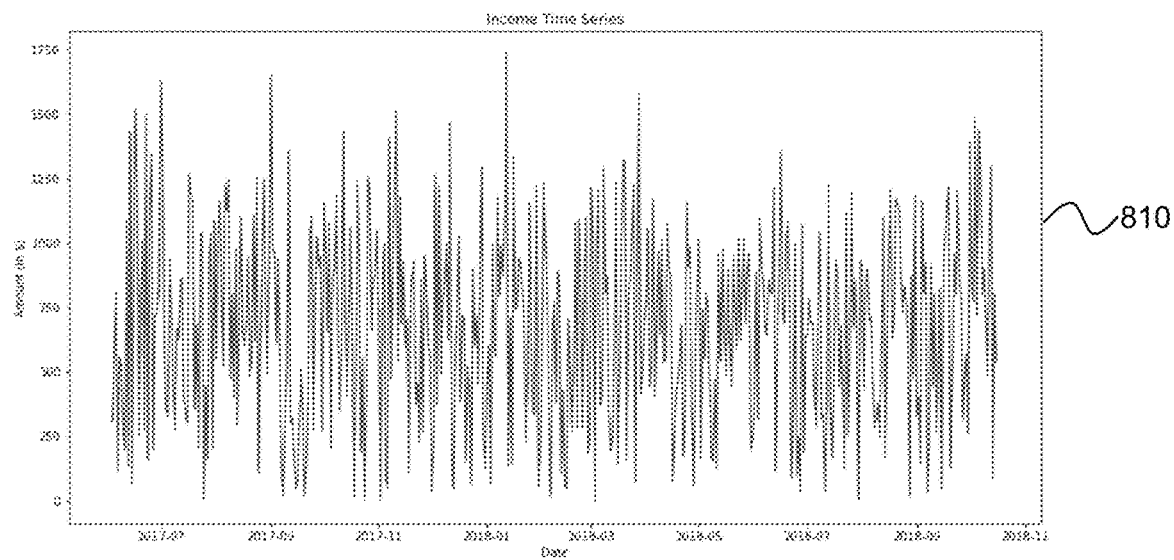
FIG. 8 is a specific illustrative chart of sparsity for time series forecasting, in accordance with one embodiment.

FIG. 8 is a specific illustrative chart 800 of sparsity for time series forecasting, in accordance with one embodiment. FIG. 8 illustrates a second time series chart 810 associated with income, which depicts low sparsity. As illustrated in the second time series chart 810, a time series having a low sparsity has more data points over time. In this specific illustrative example, the second time series chart 810 represents income of funds into accounts, which tends to be more frequent and denser.

Referring to FIGS. 2, 7 and 8 together, it is to be understood that the time series categorization module 212 determines a categorization value that categorizes the sparsity level of time series, such as the first time series chart 710 and the second time series chart 810.

Figure 9:
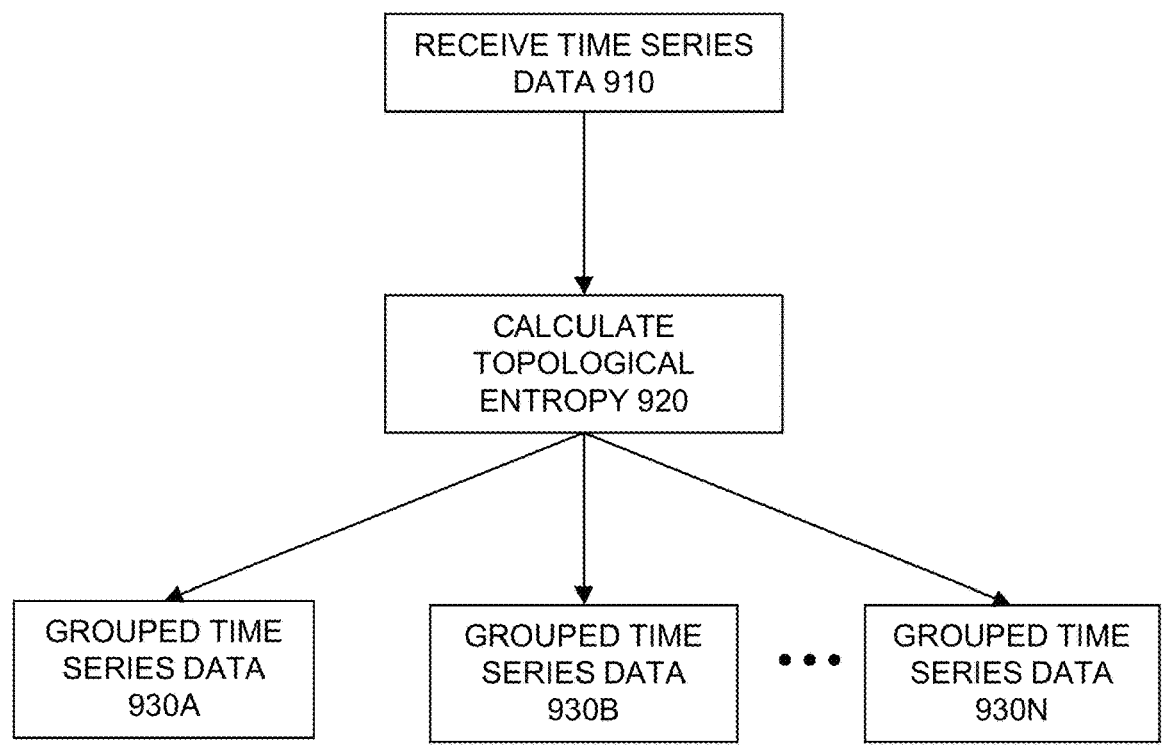
FIG. 9 is a workflow diagram of entropy calculation for time series forecasting, in accordance with one embodiment.

FIG. 9 is a workflow diagram 900 of entropy calculation for time series forecasting, in accordance with one embodiment. It is to be understood that the diagram 900 of FIG. 9 is for exemplary purposes and is not meant to be limiting. Referring to the specific illustrative examples of FIGS. 2 and 9 together, time series data is received by the time series categorization module 212, as described at RECEIVE TIME SERIES DATA 910. In the specific illustrative example of FIG. 9, the topological entropy is calculated for the received time series data, as described at CALCULATE TOPOLOGICAL ENTROPY 920. In the specific illustrative example of FIG. 9, the received time series data are grouped based on the topological entropy calculations into grouped time series data, as described at GROUPED TIME SERIES DATA 930A and 930B through 930N. It is to be understood that for each set of grouped time series data, a plurality of transforms (Ti . . . n) are examined in relation to a plurality of prediction algorithms (Pi . . . n).

Figure 10:
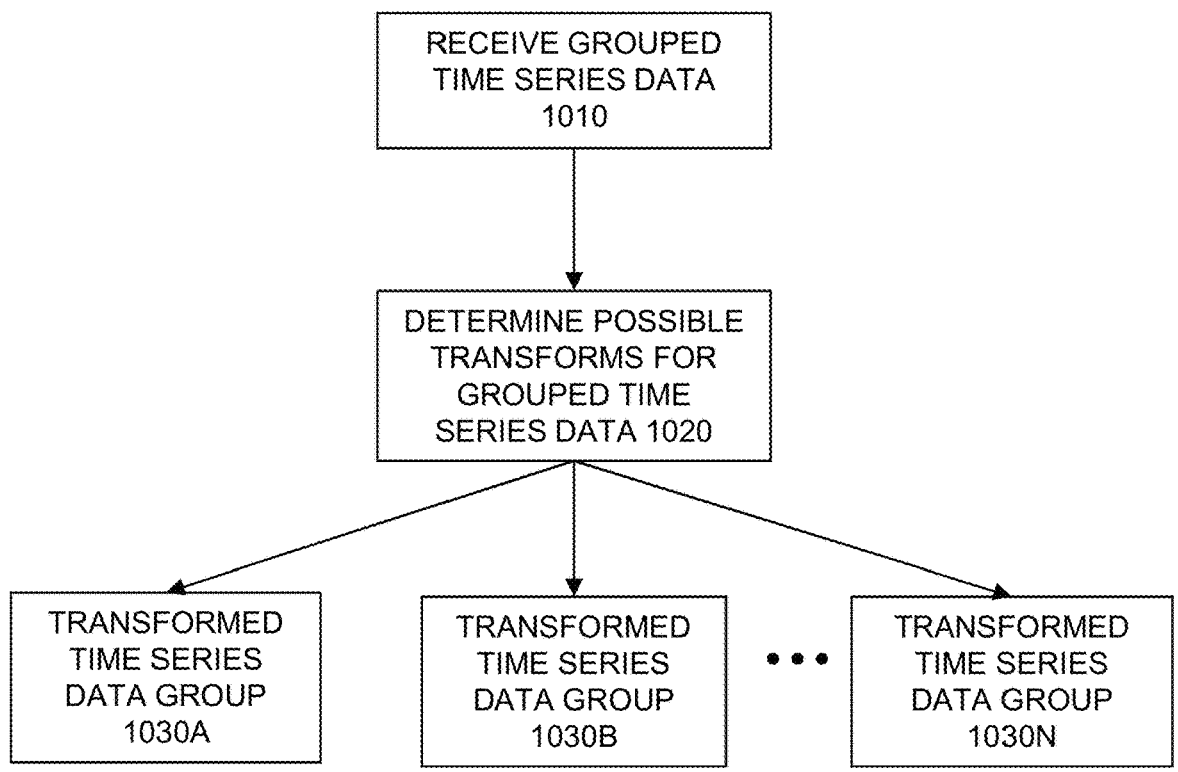
FIG. 10 is a workflow diagram of transforms of data series groups for time series forecasting, in accordance with one embodiment.

FIG. 10 is a workflow diagram 1000 of transforms of data series groups for time series forecasting, in accordance with one embodiment. It is to be understood that the diagram 1000 of FIG. 10 is for exemplary purposes and is not meant to be limiting. Referring to the specific illustrative examples of FIGS. 2, 9 and 10 together, a grouped time series is received by the meta-model decision engine training module 230, as described at RECEIVE GROUPED TIME SERIES DATA 1010. In one embodiment, such grouped time series is grouped as described in FIG. 9. In the specific illustrative example of FIG. 10, possible transforms are determined for the grouped time series data, as described at DETERMINE POSSIBLE TRANSFORMS FOR GROUPED TIME SERIES DATA 1020. In one embodiment, a possible input transform is a Box Cox transform, an integrated time series transform, a varying time scale transform, and/or any other suitable possible transforms. In one embodiment, possible input transforms include changing a temporal scale from daily to weekly, daily to monthly, weekly to monthly, and/or any other suitable temporal scale changes. In the specific illustrative example of FIG. 10, grouped time series data is transformed based on the applicable transform, as described at TRANSFORMED TIME SERIES DATA GROUP 1030A and 1030B through 1030N.

Figure 11:
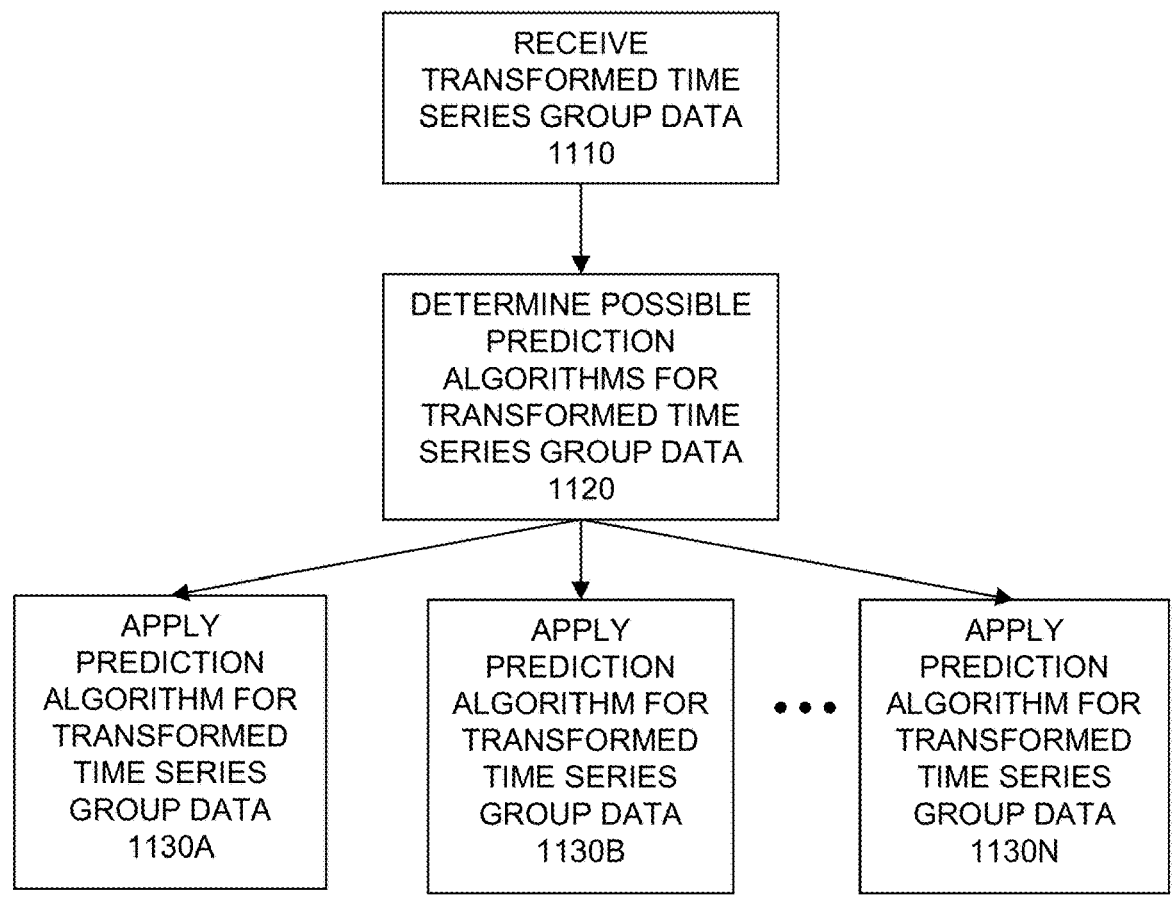
FIG. 11 is a workflow diagram of possible prediction algorithms applied to transformed data series groups for time series forecasting, in accordance with one embodiment.

FIG. 11 is a workflow diagram 1100 of possible prediction algorithms applied to transformed data series groups for time series forecasting, in accordance with one embodiment. It is to be understood that the diagram 1100 of FIG. 11 is for exemplary purposes and is not meant to be limiting. Referring to the specific illustrative examples of FIGS. 2, 9, 10, and 11 together, transformed time series group data is received, as described at RECEIVE TRANSFORMED TIME SERIES GROUP DATA 1110. In one embodiment, such time series group data is transformed as described in FIG. 10. In the specific illustrative example of FIG. 11, possible prediction algorithms are determined for the transformed time series group data by the meta-model decision engine training module 230, as described at DETERMINE POSSIBLE PREDICTION ALGORITHMS FOR TRANSFORMED TIME SERIES GROUP DATA 1120. In the specific illustrative example of FIG. 11, prediction algorithms are applied for transformed time series group data, as described at APPLY PREDICTION ALGORITHM FOR TRANSFORMED TIME SERIES GROUP DATA 1130A and 1130B through 1130N.

In one embodiment, for non-sparse time series, a possible prediction algorithm is an auto-regressive approach including Autoregressive Integrated Moving Average (ARIMA) plus Holt-Winters Exponential Smoothing, Recurrent Neural Network-long short-term memory (RNN-LSTM) plus Markov Chain Monte Carlo/Dropout (MCM), RNN-LSTM plus Gaussian Process, hybrid of ARIMA plus RNN, and/or any other suitable auto-regressive approaches.

In one embodiment, for sparse time series, a possible prediction algorithm is a regressive approach including a periodic approach of computing Fourier modes and identifying a periodic behavior of the time series and aperiodic approaches of decomposition into two regressions to forecast the time of occurrence of events and the magnitude as two separate regression problems, decreasing the time scale by averaging the data over a larger window and posing the problem as a temporal regression using Young's algorithm with deep neural networks and Gaussian Process, computing a cumulative distribution of the time series and posing the problem as a regression using Young's algorithm with neural networks and Gaussian Process, and/or any other suitable regressive approaches.

It is to be understood that, in one embodiment, the number of models available for selection is the product of the number of possible transforms and the number of possible prediction algorithms that are applicable to such transforms. As a specific illustrative example, if there are three transforms and four prediction algorithms, then twelve time series models are available to be selected for each time series data set. In this example, if there were one hundred time series in a group of grouped time series training data 214, then the number of possibilities would be 1,200, which is one hundred times twelve. In this example, one hundred appropriate models are selected, in which each is used as a label, as discussed further below with respect to FIG. 12. It is to be understood that this example is not meant to be limiting, and that there may be any number of time series, groups, transforms and prediction algorithms.

FIG. 12 is a specific illustrative example table 1200 of model labels for time series forecasting, in accordance with one embodiment. It is to be understood that the table 1200 of FIG. 12 is for exemplary purposes and is not meant to be limiting. Referring to the specific illustrative example of FIGS. 2, 3, and 12 together, in one embodiment, the model label table 1200 is used by the meta-model decision engine training module 230 for training. In one embodiment, after a model is learned and a prediction is desired, if a certain combination of features is extracted from the time series input data 310, then the model label table 1200 defines the label, which is the appropriate model for predicting time series with those features.

In one embodiment, for each grouping of time series data, there is one respective table 1200 that would be learned. In one embodiment, the table 1200 includes a column 1211 that represents a time series identifier field. In one embodiment, each row of the table 1200 represents a time series, and each time series has an identifier to uniquely identify the time series. In one embodiment, the table 1200 has a row 1221 represented by a first time series identifier, a row 1231 represented by a second time series identifier, and a row 1241 represented by an Nth time series identifier. It is to be understood that the table 1200 may have any number of rows represented by any number of time series identifiers. Accordingly, the table 1200 comprises first and second through Nth rows.

In one embodiment, the table 1200 has a column 1212 representing a feature A field, a column 1213 representing a feature B field, and a column 1214 representing a feature N field. It is to be understood that the table 1200 may have any number of columns representing feature fields. Accordingly, the table 1200 comprises features A and B through N columns. As depicted in table 1200, cells 1222, 1223, 1224, 1232, 1233, 1234, 1242, 1243, and 1244 represent features of the respective time series. It is to be understood that any number of cells may be included with the table 1200 based on the respective number of columns and the respective number of rows.

In one embodiment, at least one feature is utilized by a machine learning algorithm that provides for learning from a particular time series to pick a transform and a prediction algorithm. In one embodiment, a feature includes sparsity, percent nonzero values, periodicity metrics, number of peaks, length of time series, seasonality metrics, anomalies detected, and/or any other suitable features. In one embodiment, for a financial transaction management domain, a feature includes the types of time series of the transaction stream, the types of institutional accounts a transaction stream is received from, the types of transactions involved for a transaction stream, company demographics such as industry, geography, age of company, annual sales and number of employees, and/or any other suitable financial transaction management domain properties.

In one embodiment, the table 1200 has a column 1215 representing a label field. In one embodiment, a label is represented by a model comprising an input transform and a prediction algorithm. As a specific illustrative example, cell 1225 may be represented by a transform of "Box_Cox" and a prediction algorithm of "Arima." As a specific illustrative example, cell 1235 may be represented by a transform of "Monthly" and a prediction algorithm of "LSTM." It is to be understood that any combination of transform and prediction algorithm can represent any number of labels for a respective time series identifier, such as an Nth label for cell 1245. Accordingly, the table 1200 comprises first and second through Nth labels.

As a specific illustrative example, there may be three different groupings of time series. In this specific illustrative example, the first grouping comprises eleven time series, the second grouping comprises twelve time series, and the third grouping comprises thirteen time series. In this specific illustrative example, there is a first table corresponding to the first grouping, and the first table has eleven rows corresponding to the eleven time series. In this specific illustrative example, there is a second table corresponding to the second grouping, and the second table has twelve rows corresponding to the twelve time series. In this specific illustrative example, there is a third table corresponding to the third grouping, and the third table has thirteen rows corresponding to the thirteen time series. It is to be understood that such groupings are for exemplary purposes and is not meant to be limiting.

Figure 13:
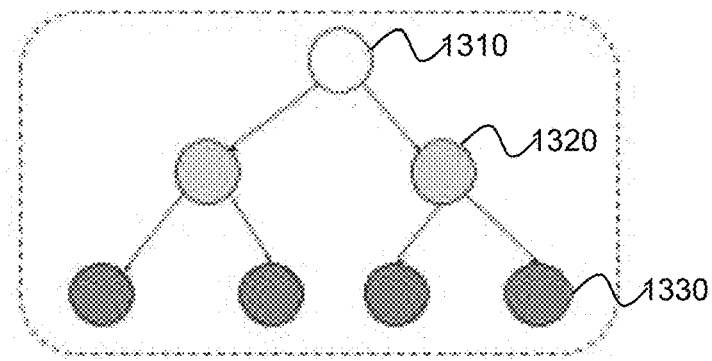
FIG. 13 is a decision tree diagram of a meta-model decision graph for time series forecasting, in accordance with one embodiment.

FIG. 13 is a decision tree diagram 1300 of a meta-model decision graph for time series forecasting, in accordance with one embodiment. Referring to FIGS. 2, 3, and 13 together, in one embodiment, the decision tree diagram 1300 illustrates a decision tree, which is a type of a decision graph, which is a type of a meta-model artifact 240. In one embodiment, the decision tree diagram 1300 illustrates a root node 1310. In one embodiment, the decision tree diagram 1300 illustrates a plurality of branch nodes 1320 stemming from the root node 1310. It is to be understood that the decision tree diagram 1300 may have any number of branch nodes 1320 and any number of levels of branch nodes 1320. As a specific illustrative example, a first branch node may be followed by a second branch node. In one embodiment, the decision tree diagram 1300 illustrates a plurality of leaf nodes 1330 branching from the branch nodes 1320.

In one embodiment, traversal of the decision tree represented by the diagram 1300 begins at the root node 1310, proceeds through a path of the branch nodes 1320, until a leaf node 1330 is reached, as is known by one skilled in the art. In one embodiment, traversal of the decision tree of the diagram 1300 enables questions to be applied to input data. In one embodiment, the decision tree of the diagram 1300 can be modified by an expert user through modification of the root node 1310, the branch nodes 1320, and the leaf nodes 1330. In one embodiment, the meta-model artifact 240 is represented by the decision tree diagram 1300.

In one embodiment, after a decision tree of the diagram 1300 is learned from first time series data, it can be retrained from second time series data. It is to be understood that this embodiment is not meant to be limiting, and that there may be any number of time series data. In one embodiment, after a decision tree of the diagram 1300 is learned, additional input transforms and additional prediction algorithms can be added, and the decision tree of the diagram 1300 can be retrained based on those additions. In one embodiment, after a decision tree of the diagram 1300 is learned by the meta-model decision engine training module 230, the decision tree of the diagram 1300 is queried by the model selection engine module 330. In one embodiment, the decision tree of the diagram 1300 is queried for a label. In one embodiment, the label is a combination of an input transform and a prediction algorithm.

In one embodiment, sequence input data is received by the prediction system 140. In one embodiment, the sequence input data is received from the data management system 150. In one embodiment, the sequence input data is time series input data. In one embodiment, the sequence input data is transformed into transformed sequence input data. In one embodiment, the transformed sequence input data is transformed time series input data. In one embodiment, the transformed sequence input data is transformed based on selected input transforms. In one embodiment, the selected input transforms are selected by the model selection system 130.

In one embodiment, the model selection system 130 selects the selected input transforms based on trained meta-model artifacts and the sequence input data. In one embodiment, the sequence input data is sequence time series data. In one embodiment, the sequence input data is received by the model selection system 130. In one embodiment, the sequence input data is received from the data management system 150.

In one embodiment, trained meta-model artifacts are generated by the meta-model training system 120. In one embodiment, the trained meta-model artifacts are based on grouped sequence training data. In one embodiment, the grouped sequence training data is grouped time series training data. In one embodiment, the grouped sequence training data is grouped based on a categorization of sequence training data received by the meta-model training system 120. In one embodiment, the sequence training data is received from the data management system 150. In one embodiment, the sequence training data is time series training data. In one embodiment, a categorization of the sequence training data is based on a sparsity categorization property to form groupings. In one embodiment, the meta-model training system 120 generates the meta-model artifacts based on possible prediction algorithms and associated possible input transforms. In one embodiment, the meta-model training system 120 generates the meta-model artifacts based on objective functions including accuracy components, training time components, inference time components, and expert penalty components.

In one embodiment, the prediction system 140 determines prediction output data based on selected prediction algorithms associated with selected input transforms. In one embodiment, the selected prediction algorithms are selected based on the trained meta-model artifacts trained by the meta-model training system 120 and the sequence input data received by the model selection system 130. In one embodiment, the prediction output data is delivered to user systems associated with the data management system 150.

Term Definitions

Various embodiments of systems and methods described herein include one or more computers, which may be referred to herein as computing systems or processors. As used herein, the term computer includes any programmable machine or machines capable of performing arithmetic and/or logical operations. In various embodiments, computers include one or more of processors, memories, data storage devices, and/or other known or novel components as discussed herein, and/or as known in the art at the time of filing, and/or as developed after the time of filing. In various embodiments, these components are connected physically or through network or wireless links. In various embodiments, computers include software which directs the operations of the aforementioned components.

Herein, computers may be referred to with terms that are commonly used by those of ordinary skill in the relevant arts, such as servers, PCs, mobile devices, routers, switches, data centers, distributed computers, and other terms. In various embodiments, computers facilitate communications between users and/or other computers, provide databases, perform analysis and/or transformation of data, and/or perform other functions. It will be understood by those of ordinary skill that those terms used herein are interchangeable, and any computer capable of performing the described functions may be used.

In various embodiments, computers may be linked to one another via a network or networks. In various embodiments, a network is any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connections). In various embodiments, connections between computers may use any protocols, including connection-oriented protocols such as TCP or connectionless protocols such as UDP. Any connection through which at least two computers may exchange data can be the basis of a network.

Herein, the term application includes, but is not limited to, any system or software program capable of being implemented on a computing system, accessed through one or more servers, accessed through a network, accessed through a cloud, and/or provided through any system or by any means, as discussed herein, and/or as known in the art at the time of filing, and/or as developed after the time of filing.

Herein, a data management system can be, but is not limited to, any system or application implemented on a computing system, accessed through one or more servers, accessed through a network, accessed through a cloud, and/or provided through any system or by any means, as discussed herein, and/or as known in the art at the time of filing, and/or as developed after the time of filing, that gathers data from one or more sources and/or has the capability to analyze and categorize at least part of the data.

Herein, a financial management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

As used herein, the term financial management system includes, but is not limited to the following: computing system implemented, and/or online, and/or web-based, personal and/or business financial data management systems, services, packages, programs, modules, or applications; computing system implemented, and/or online, and/or web-based, personal and/or business regulation compliance systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

As used herein, the terms artificial intelligence, machine learning, and machine learning algorithms include, but are not limited to, machine learning algorithms for predictive model training operations such as one or more of artificial intelligence operations, regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

Herein, the terms model and machine learning model may be used interchangeably and include, but are not limited to, any predictive model used to provide output data and/or predictions data to one or more systems or applications. Examples of models and machine learning models include, but are not limited to, supervised machine learning models, unsupervised machine learning models, semi-supervised machine learning models, deep learning machine learning models, and/or any other form or type of model used to provide output data and/or predictions data to one or more systems or applications as discussed herein, and/or as known in the art at the time of filing, and/or as developed after the time of filing.

Herein, the terms system and application system may be used interchangeably and include, but are not limited to, various components used to provide functionality and operations associated with an application. Examples of application system components include, but are not limited to, application customization components, predictive models, and various component interfaces.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining," "training," "extracting," "executing," "mapping," "analyzing," "providing," "enforcing," "monitoring," "generating," "defining," "determining," "calculating," "transforming," "correlating," "normalizing," "accessing," "identifying," "associating," "aggregating," "initiating," "collecting," "creating," "transferring," "storing," "searching," "comparing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented method comprising:
receiving a plurality of training data sets each representing different time series data;
determining, for each respective training data set, a sparsity value indicative of a degree of sparsity among the time series data represented by the respective training data set;
generating a plurality of data set groups based on the determined sparsity values, each data set group including a subset of the training data sets having a similar degree of sparsity;
identifying a plurality of prediction algorithms and input transforms;
receiving time series input data associated with the plurality of data set groups;
extracting feature parameters from the time series input data;
selecting a meta-model for each respective data set group based on the extracted feature parameters, each meta-model identifying a best prediction algorithm and best input transform statistically most suitable for increasing an accuracy of predictions generated based on the time series input data associated with the respective data set group;
transforming the time series input data for each respective data set group into a corresponding transformation using the best input transform identified for the respective data set group; and
generating, for each respective data set group, one or more predictions about future values of the associated time series input data based on applying the best prediction algorithm identified for the respective data set group to its corresponding transformation.

2. The method of claim 1, wherein selecting the meta-models is further based on weighted sums generated using one or more objective functions.

3. The method of claim 2, wherein the one or more objective functions include at least one of accuracy components, training time components, or inference time components.

4. The method of claim 2, wherein the one or more objective functions incorporate expert penalty data received from an expert user.

5. The method of claim 4, wherein the expert penalty data is a penalty value for one of the prediction algorithms.

6. The method of claim 4, wherein the expert penalty data is a penalty value for one of the input transforms.

7. The method of claim 1, wherein the prediction algorithms and input transforms are identified using a decision graph.

8. The method of claim 7, wherein the decision graph is a decision tree.

9. The method of claim 1, wherein the prediction algorithms and input transforms are identified using a model label table.

10. The method of claim 1, wherein each data set group is associated with a different range of sparsity values.

11. The method of claim 1, wherein generating the data set groups is based on topological entropy.

12. A system comprising:
one or more processors; and
at least one memory coupled to the one or more processors and storing instructions that, when executed by the one or more processors, cause the system to perform operations including:
receiving a plurality of training data sets each representing different time series data;
determining, for each respective training data set, a sparsity value indicative of a degree of sparsity among the time series data represented by the respective training data set;
generating a plurality of data set groups based on the determined sparsity values, each data set group including a subset of the training data sets having a similar degree of sparsity;
identifying a plurality of prediction algorithms and input transforms;
receiving time series input data associated with the plurality of data set groups;
extracting feature parameters from the time series input data;
selecting a meta-model for each respective data set group based on the extracted feature parameters, each meta-model identifying a best prediction algorithm and best input transform statistically most suitable for increasing an accuracy of predictions generated based on the time series input data associated with the respective data set group;
transforming the time series input data for each respective data set group into a corresponding transformation using the best input transform identified for the respective data set group; and
generating, for each respective data set group, one or more predictions about future values of the associated time series input data based on applying the best prediction algorithm identified for the respective data set group to its corresponding transformation.

13. The system of claim 12, wherein selecting the meta-models is further based on weighted sums generated using one or more objective functions.

14. The system of claim 13, wherein the one or more objective functions include at least one of accuracy components, training time components, or inference time components.

15. The system of claim 13, wherein the one or more objective functions incorporate expert penalty data received from an expert user.

16. The system of claim 15, wherein the expert penalty data is a penalty value for one of the prediction algorithms.

17. The system of claim 15, wherein the expert penalty data is a penalty value for one of the input transforms.

18. The system of claim 12, wherein the prediction algorithms and input transforms are identified using a decision graph.

19. The system of claim 18, wherein the decision graph is a decision tree.

20. The system of claim 12, wherein the prediction algorithms and input transforms are identified using a model label table.

21. The system of claim 12, wherein each data set group is associated with a different range of sparsity values.

22. The system of claim 12, wherein generating the data set groups is based on topological entropy.

23. A computing system implemented method comprising:
receiving sequence input data associated with a plurality of sequences;
identifying a plurality of prediction algorithms and input transforms;
extracting feature parameters from the sequence input data;
generating, using training data associated with the sequence input data, trained meta-model artifacts based on one or more objective functions each including an accuracy component;
selecting one of the input transforms and one of the prediction algorithms for each respective sequence based on the trained meta-model artifacts and the extracted feature parameters;
transforming the sequence input data into transformed sequence input data based on the selected input transforms and a set of sequence training data grouped based on a sparsity categorization property indicative of a degree of sparsity associated with the corresponding sequence training data; and
determining prediction output data based on the selected prediction algorithms associated with the selected input transforms.

24. The method of claim 23, wherein the objective functions further include at least one of training time components, inference time components, or expert penalty components.

25. The method of claim 23, further comprising:
delivering the prediction output data to one or more user systems.

26. The method of claim 23, wherein the sequence input data is time series input data and the set of sequence training data is grouped time series training data.

* * * * *